United States Patent
Salter et al.

(10) Patent No.: US 10,576,851 B2
(45) Date of Patent: Mar. 3, 2020

(54) CARGO LOADER

(71) Applicant: Ford Global Technologies, LLC, Dearborn, MI (US)

(72) Inventors: Stuart C. Salter, White Lake, MI (US); Paul Kenneth Dellock, Northville, MI (US); Annette Lynn Huebner, White Lake, MI (US); Pietro Buttolo, Dearborn Heights, MI (US); Lori Ross, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 16/036,418

(22) Filed: Jul. 16, 2018

(65) Prior Publication Data

US 2020/0017005 A1  Jan. 16, 2020

(51) Int. Cl.
| | |
|---|---|
| *B60N 2/36* | (2006.01) |
| *B60R 5/04* | (2006.01) |
| *B60N 2/30* | (2006.01) |
| *G01G 19/414* | (2006.01) |
| *B60N 2/02* | (2006.01) |

(52) U.S. Cl.
CPC ............. *B60N 2/36* (2013.01); *B60N 2/0244* (2013.01); *B60N 2/3011* (2013.01); *B60R 5/041* (2013.01); *G01G 19/414* (2013.01); *B60N 2002/363* (2013.01)

(58) Field of Classification Search
CPC .... B60N 2/0244; B60N 2/0296; B60N 2/206; B60N 2/24; B60N 2/3002; B60N 2/3011; B60N 2/36; B60R 5/041

USPC .......... 296/37.16, 65.01, 65.05, 65.13, 65.16
See application file for complete search history.

(56) References Cited

U.S. PATENT DOCUMENTS

| | | | |
|---|---|---|---|
| 5,039,155 A * | 8/1991 | Suman | B60N 2/3097 296/37.15 |
| 6,364,391 B1 * | 4/2002 | Everett | B60N 2/24 296/51 |
| 6,598,926 B1 | 7/2003 | Price et al. | |
| 7,044,550 B2 | 5/2006 | Kim | |
| 7,159,922 B2 | 1/2007 | Iyoda et al. | |
| 8,186,736 B2 | 5/2012 | Jouraku | |
| 8,353,550 B1 | 1/2013 | Lucas | |
| 8,936,301 B2 * | 1/2015 | Thota | B60N 2/206 296/193.07 |
| 2009/0108639 A1 | 4/2009 | Sturt et al. | |
| 2011/0095571 A1 | 4/2011 | Maguire et al. | |

(Continued)

FOREIGN PATENT DOCUMENTS

EP    2998161 A1 *  3/2016  ............... B60R 7/04

OTHER PUBLICATIONS

Basha Australia 4×4 Accessors—Ballart 60-80 Litre Tilt Fridge slide code 035, http//www.bashaaustralia.com/product-page/60-80-litre-tilt-fridge-slide-code-035.

*Primary Examiner* — Jason S Daniels
(74) *Attorney, Agent, or Firm* — Frank A. MacKenzie; Bejin Bieneman PLC

(57) ABSTRACT

A vehicle seat includes a seat back and a track attached to the seat back. An extendible member is moveably engaged with the track. The extendible member is moveable along the seat back between a retracted position and an extended position. The extendible member extends outside a vehicle when the extendible member is in the extended position.

19 Claims, 15 Drawing Sheets

(56) References Cited

U.S. PATENT DOCUMENTS

2012/0132601 A1  5/2012 Giorgis et al.
2013/0147226 A1  6/2013 Cao et al.

\* cited by examiner

CARGO LOADER

BACKGROUND

Many automobiles have a cargo area behind one or more rows of passenger seats. In some vehicles, one or more rows of passenger seats can be folded into a vehicle floor or removed from the vehicle to enlarge the cargo space.

DETAILED DESCRIPTION

Figure 1:
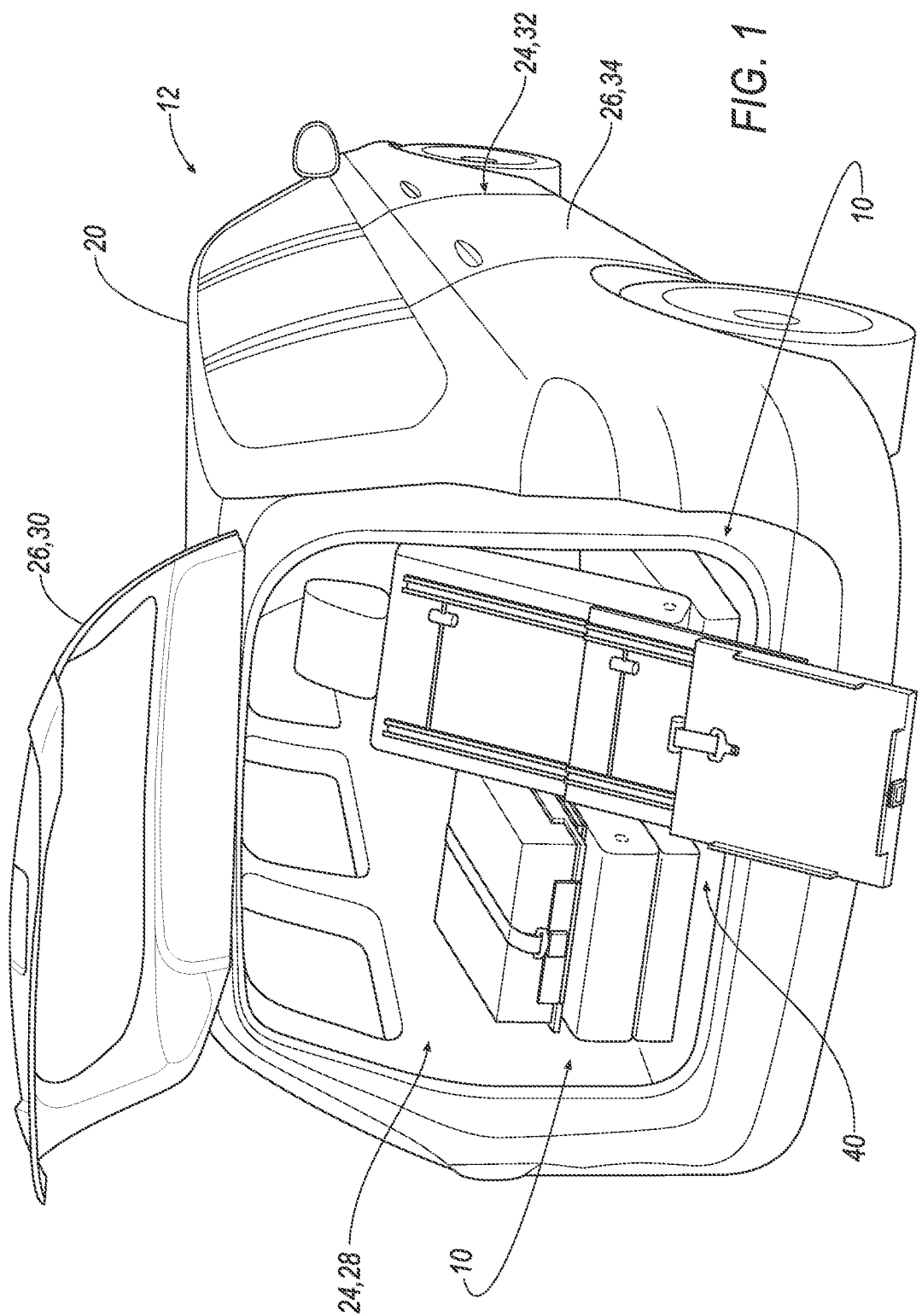
FIG. 1 is a perspective view of a vehicle including a cargo loader.

An example vehicle seat includes a seat back, a track attached to the seat back, and an extendible member moveably engaged with the track. The extendible member is moveable along the seat back between a retracted position and an extended position. The extendible member extends outside a vehicle when the extendible member is in the extended position.

The vehicle seat may further include a cargo rack disposed on the extendible member. In that instance, the cargo rack may move with the extendible member relative to the seat back. In some instances, the cargo rack has a platform having a plurality of sides and a plurality of ledges. Each of the plurality of ledges may extend from a respective one of the plurality of sides. The plurality of sides may include a bottom side, and the plurality of ledges may include a bottom ledge extending from the bottom side.

In some possible implementations, a weight sensor may be disposed on the bottom ledge.

In some possible approaches, the vehicle seat may include a buckle disposed on a first one of the plurality of ledges and a retractor disposed on a second one of the plurality of ledges. The second one of the plurality of ledges may be disposed on one of the plurality of sides of the cargo rack opposite the first one of the plurality of ledges. Further, the vehicle seat may include a belt having a latch and extending from the retractor. The latch may be releasably engageable with the buckle.

In some possible implementations, the vehicle seat may include a computer including a memory and a processor programmed to execute instructions stored in the memory. The instructions may include outputting a control signal to the buckle to release the latch from the buckle.

In some instances, the extendible member may include a plurality of sliding members. The plurality of sliding members may include a first sliding member and a second sliding member. The first sliding member may be moveable along the track. The second sliding member may be moveable relative to the first sliding member.

An example vehicle computer includes a memory and a processor programmed to execute instructions stored in the memory. The instructions may include receiving a user cargo data, controlling a vehicle door based on the user cargo data, and controlling a vehicle seat having a seat back and a cargo rack based on the user cargo data. The cargo rack may be disposed on an extendible member supported by the seat back. Controlling the vehicle seat may include outputting a control signal commanding the extendible member to move between a retracted position and an extended position. The extendible member may extend outside a vehicle when the extendible member is in the extended position moveably engaged to the vehicle seat.

In some instances, the user cargo data may include a request of one of cargo pickup and no cargo pickup.

In some possible implementations, controlling the vehicle door may include opening a vehicle door as a result of receiving the user cargo data. In that instance, the user cargo data may be received as a user input provided to one of a vehicle sensor and a fob.

In some possible approaches, controlling the vehicle seat and the cargo rack may include moving the seat back of the vehicle seat from one of a first predetermined position and a second predetermined position to a third predetermined position and moving the extendible member along a track disposed on the seat back from a retracted position to an extended position. Further, wherein controlling the vehicle seat and the cargo rack may include moving the extendible member along the track disposed on the seat back from the extended position to the retracted position and moving the seat back from the third predetermined position to one of the first predetermined position and the second predetermined position after moving the extendible member to the retracted position.

An example vehicle includes a body defining an opening, a seat having a seat base supported by the body and having a seat back supported by the seat base, a track disposed on the seat back, and an extendible member moveably engaged with the track. The extendible member may be moveable along the seat back between a retracted position and an extended position. In the extended position, the extendible member extends outside the opening of the body.

In some possible approaches, the vehicle further includes a cargo rack disposed on the extendible member. The cargo rack moves with the extendible member relative to the seat back.

In some instances, the cargo rack may have a platform having a plurality of sides and a plurality of ledges. Each of the plurality of ledges may extend from a respective one of the plurality of sides. The plurality of sides may include a bottom side. The plurality of ledges includes a bottom ledge extending from the bottom side.

In some possible implementations, the vehicle may include a weight sensor fixed to the bottom ledge.

In some instances, the vehicle may include a buckle disposed on a first one of the plurality of ledges and a retractor disposed on a second one of the plurality of ledges. The second one of the plurality of ledges may be disposed on one of the plurality of sides of the cargo rack opposite the first one of the plurality of ledges. The vehicle may further include a belt extending from the retractor and releasably engageable with the buckle.

In some possible approaches, the vehicle may further include a computer including a memory and a processor programmed to execute instructions stored in the memory. The instructions may include outputting a control signal to the buckle to release the latch from the buckle.

In some instances, the extendible member may include a plurality of sliding members, which may include a first sliding member and a second sliding member. The first sliding member may be moveable along the track and the second sliding member may moveable relative to the first sliding member.

With reference to the Figures, wherein like numerals indicate like parts throughout the several views, a vehicle seat 10 of a vehicle 12 includes a seat back 14 and a track 16 attached to the seat back 14. An extendible member 18 is moveably engaged with the track 16. The extendible member 18 is moveable along the seat back 14 between a retracted position and an extended position (see FIGS. 5A-5F and 6A-6F). The extendible member 18 extends outside the vehicle 12 when the extendible member 18 is in the extended position.

In addition to rear cargo space, the vehicle 12 may provide cargo space on the seat backs 14 of the vehicle seats 10 when the seat back 14 is folded. A user may have difficulty lifting cargo such as a piece of luggage high enough to place on the seat back 14. To overcome that difficulty, the extendible member 18 extends downwards and outside the vehicle 12 and the user may place the cargo on the extended extendible member 18. After the cargo has been placed, the extendible member 18 retracts with the cargo to the seat back 14.

The vehicle 12 may be an autonomous vehicle and/or a semi-autonomous vehicle. The vehicle 12 may include a computer programmed to operate the vehicle 12 independently of the intervention of a human driver, completely or to a lesser degree. The computer may be programmed to operate the propulsion, brake system, steering, and/or other vehicle systems. For purposes of this disclosure, autonomous operation means the computer controls the propulsion, brake system, and steering; semi-autonomous operation means the computer at least partially controls one or more of the propulsion, brake system, and steering and a human driver controls the remainder; and non-autonomous operation means the human driver controls the propulsion, brake system, and steering.

With reference to FIG. 1, the vehicle 12 includes a body 20 and a cargo loader system 22. The vehicle 12 may include a plurality of cargo loader systems 22.

The body 20 may be of, e.g., unibody construction, body-on-frame construction, etc. The body 20 may be of, for example, steel, aluminum, etc. The body 20 defines an opening 24 for receiving a vehicle door 26. As an example, the opening 24 may be a rear opening 28 and may receive a rear vehicle door 30, such as a lift gate. As another example, the opening 24 may be a side opening 32 and may receive a side vehicle door 34. The side vehicle door 34 could be a sliding door, a hinged door, etc. The body 20 may include a device, such as an actuator, for opening the vehicle door 26.

The cargo loader system 22 refers to the components that carry out the cargo onloading and offloading operations upon instruction from a vehicle computer 36, and specifically, from a cargo loader controller 38. The cargo loader system 22 includes the vehicle seat 10, a cargo loader 40 and the cargo loader controller 38.

Figure 2:
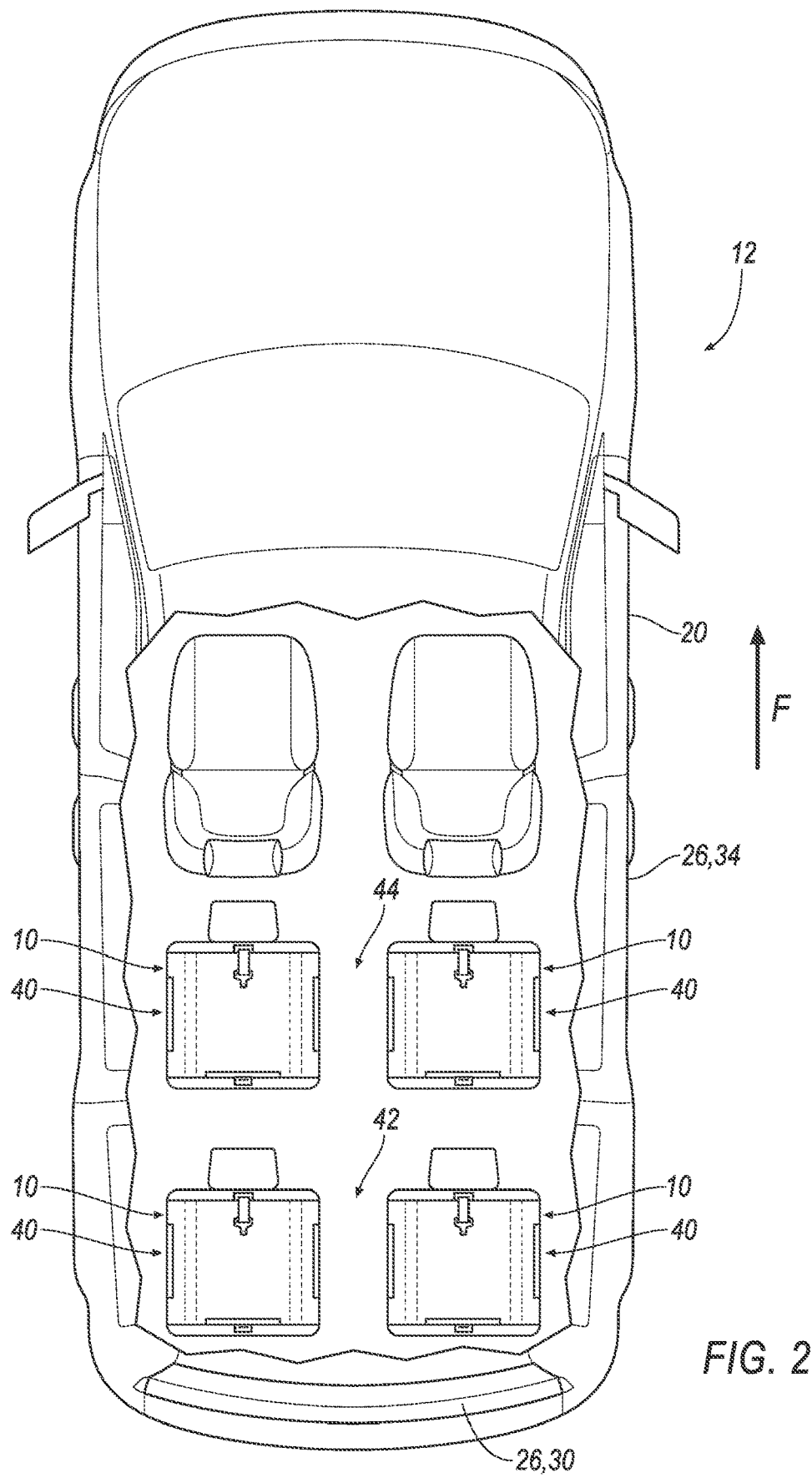
FIG. 2 is a top-level view of the vehicle.

With reference to FIG. 2, the vehicle seat 10 may face a fixed direction or may be adjustable to face different directions. As one example, the vehicle seat 10 in a rear row 42 of the vehicle 12 may be fixed in a vehicle-forward direction F, and the extendible member 18 may extend from the vehicle seat 10 to outside the vehicle 12 through the rear opening 28. As another example, the vehicle seat 10 in a middle row 44 of the vehicle 12 may rotate such that the seat back 14 faces the side opening 32, and the extendible member 18 may extend from the vehicle seat 10 to outside the vehicle 12 through the side opening 32. The vehicle seat 10 may be a bucket seat, a bench seat, or another type of seat.

Figure 3A:
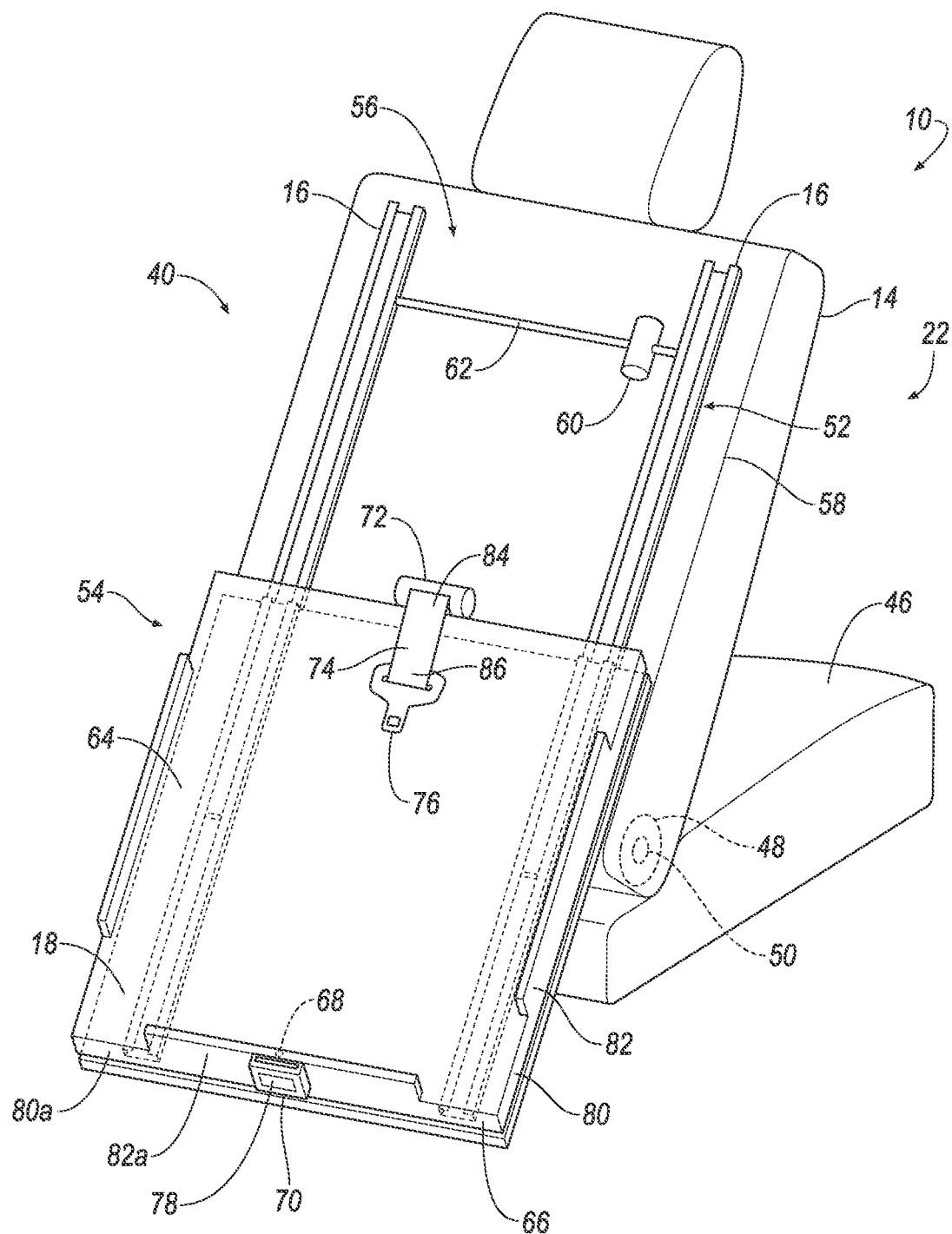
FIGS. 3A-3B are perspective views of the cargo loader.
Figure 3B:
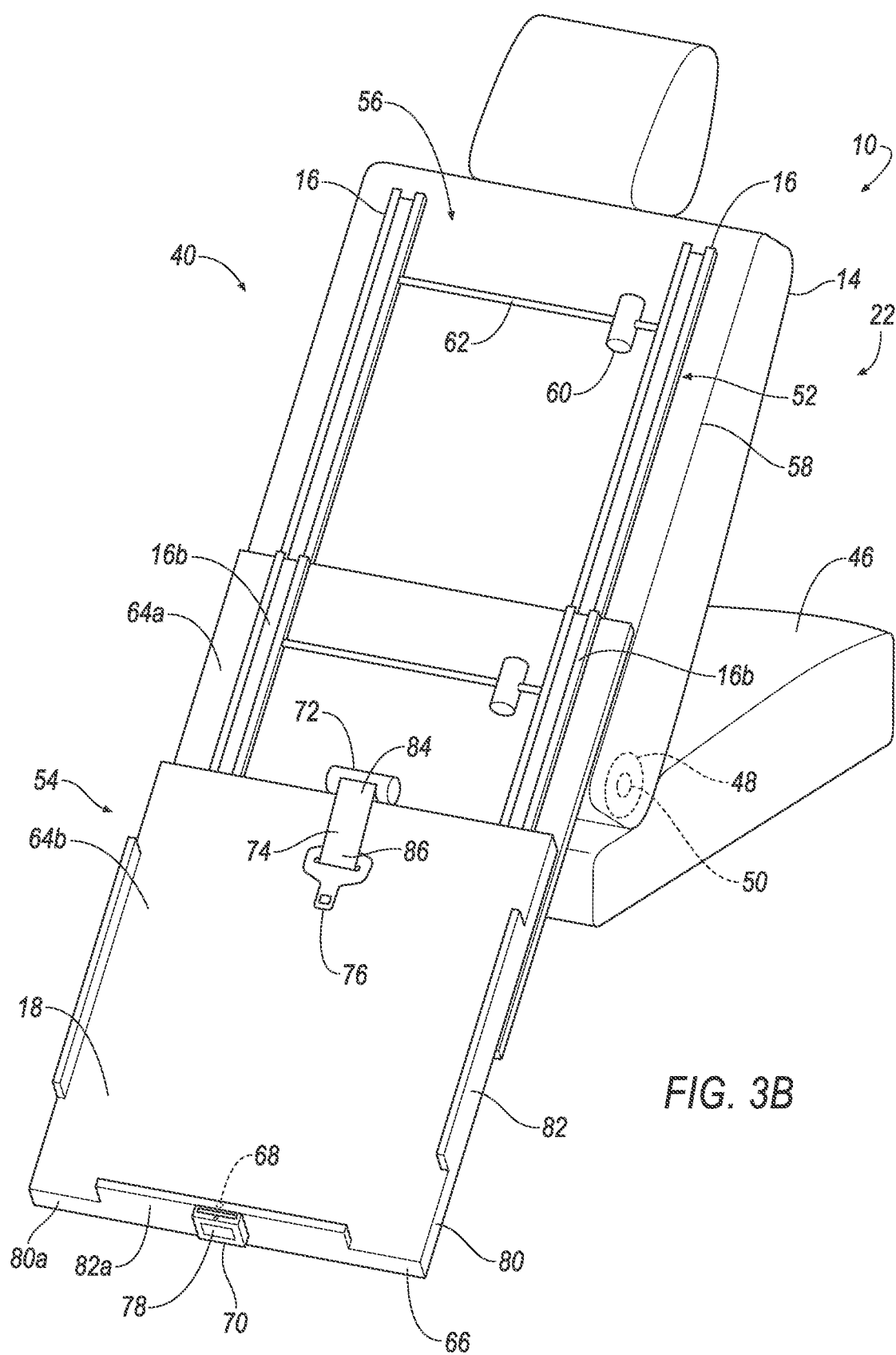

With reference to FIGS. 3A-3B, the vehicle seat 10 may include a seat base 46. The seat base 46 is supported by the body 20. As an example, the body 20 may support the seat base 46 directly and the body 20 may be fixed directly to the seat base 46 by, e.g., fasteners, welding, etc. As another example, the body 20 may support the seat base 46 indirectly through an intermediate component such as floor rails. The floor rails may be fixed to the body 20 by, e.g., fasteners, welding, etc., and the seat base 46 may be slideably engaged with the floor rails and moveable relative to the body 20.

The seat back 14 may be supported by and extend upwardly from the seat base 46. In some possible implementations, the seat back 14 may be foldable relative to the seat base 46. As an example, the seat back 14 may be pivotally connected to the seat base 46 by a hinge 48 and the seat back 14 may be moveable about the hinge 48 between, e.g., three predetermined positions, each putting the seat back 14 at a different angle relative to the seat base 46. The three predetermined positions may be referred to as a first predetermined position, a second predetermined position, and a third predetermined position. The seat back 14 may include a seat motor 50, attached to the seat back 14. The seat motor 50 may move the seat back 14 about the hinge 48.

The cargo loader 40 includes a power slide assembly 52, the extendible member 18, and a cargo rack 54.

The power slide assembly 52 may include the track 16 and a slide motor 56. The power slide assembly 52 is attached to the extendible member 18 and the seat back 14, and the slide motor 56 moves the extendible member 18 relative to the seat back 14 between the retracted position and the extended position (see FIGS. 5A-5F and 6A-6F).

The track 16 is disposed on the seat back 14. Specifically, the track 16 is attached to the seat back 14 such that the track 16 is immovably fixed to a back side 58 of the seat back 14 via, e.g., fasteners (e.g., bolts), welding, etc. As an example and as shown, the cargo loader 40 may include two tracks 16, attached to the seat back 14 and spaced from each other. The track 16 supports the extendible member 18 and may be of a material such as steel, etc.

The slide motor 56 may include a motor 60 and an actuating screw 62. The slide motor 56, specifically the actuating screw 62, is attached to the extendible member 18 and the track 16. The motor 60 and the actuating screw 62 move the extendible member 18 relative to the track 16 between the retracted position and the extended position.

The extendible member 18 is moveably engaged with the track 16. As an example, the extendible member 18 is slideably engaged with the track 16 and is supported by the seat back 14. The extendible member 18 is moveable along the seat back 14 between the retracted position and the extended position, as discussed below, with regard to FIGS. 5A-5F and 6A-6F.

With reference to FIG. 3B, the extendible member 18 may include a plurality of sliding members 64. The plurality of sliding members 64 may include a first sliding member 64a and a second sliding member 64b. The first sliding member 64a may be between the track 16 and the second sliding member 64b. The first sliding member 64a may be slideably engaged with the track 16 and may be supported by the seat back 14. The first sliding member 64a may be moveable along the track 16 between the retracted position and the extended position. A second track 16b may be disposed on the side of the first sliding member 64a opposite the track 16. The second sliding member 64b may be slideably engaged with the second track 16b and may be supported on the first sliding member 64a. The second sliding member 64b may be moveable along the second track 16b relative to the first sliding member 64a. The second sliding member 64b is moveable along the second track 16b between the retracted position and the extended position. As one example, from the retracted position, the first sliding member 64a may slide from the seat back 14 into the extended position, followed by the second sliding member 64b sliding from the first sliding member 64a into the extended position. As another example, from the retracted position, the second sliding member 64b may slide from the first sliding member 64a into the extended position, followed by the first sliding member 64a sliding from the seat back 14 into the extended position.

The plurality of sliding members 64 may differ in size. The extendible member 18 and the plurality of sliding members 64 may differ in material and may be of material, such as a rigid polymer, a metal, a composite, etc.

The cargo rack 54 may be disposed on the extendible member 18. The cargo rack 54 moves with the extendible member 18 relative to the seat back 14. The cargo rack 54 includes a platform 66, a weight sensor 68, a buckle 70, a retractor 72, a belt 74 having a latch 76 and an indicator light 78.

The platform 66 receives the cargo and is supported by the extendible member 18. The platform 66 may include a plurality of sides 80, such as four sides, one of which may include a bottom side 80a. The platform 66 may include a plurality of ledges 82 and each of the plurality of ledges 82 may extend from a respective one of the plurality of sides 80. As shown in FIGS. 3A-3B, the platform 66 may include three ledges 82 extending from three of the four sides 80 of the platform 66 including a bottom ledge 82a extending from the bottom side 80a. The platform 66 may be of material such as plastic, metal, etc.

The weight sensor 68 may be disposed on the bottom ledge 82a. Specifically, the weight sensor 68 may be fixed to the bottom ledge 82a. The weight sensor 68 is programmed to measure the weight of cargo being loaded onto the platform 66. The weight sensor 68 may output the measured weight of the cargo to the vehicle computer 36. When the vehicle computer 36 receives fluctuations in the measured weight of cargo, the vehicle computer 36 may determine that cargo is actively being onloaded or offloaded.

The buckle 70 may be disposed on the bottom side 80a of the platform 66 and the retractor 72 may be disposed on a top side 80b.

The belt 74 may be attached to the retractor 72 at a first end 84 and attached to the latch 76, i.e., a cargo retention belt latch, on a second end 86. The belt 74 may extend from the retractor 72 to the buckle 70, and the latch 76 may be releasably engageable with the buckle 70. The first end 84 of the belt 74 may be fixed to the retractor 72, and the second end 86 of the belt 74 may be fixed to the latch 76. The latch 76 and the belt 74 may extend from the retractor 72 to the buckle 70. The latch 76 may be engaged with the buckle 70 manually and may be released from the buckle 70 electronically, i.e., a buckle controller 88 may output a buckle control signal to actuate the buckle 70 to release the latch 76 upon instruction from the cargo loader controller 38. The belt 74 having the latch 76 engaged with and electronically releasable from the buckle 70 provides additional convenience for the user.

As an example and as shown, the indicator light 78 may be attached to the buckle 70. The indicator light 78 may be a Light Emitting Diode (LED) or another electronic light source. The indicator light 78 may be used to indicate a status of the cargo loader system 22. The indicator light 78 may illuminate for various conditions such as to attract the user's attention to cargo not within a predetermined weight range, and to indicate to the user that the cargo loader system 22 is ready/not ready to receive a load.

Figure 4:
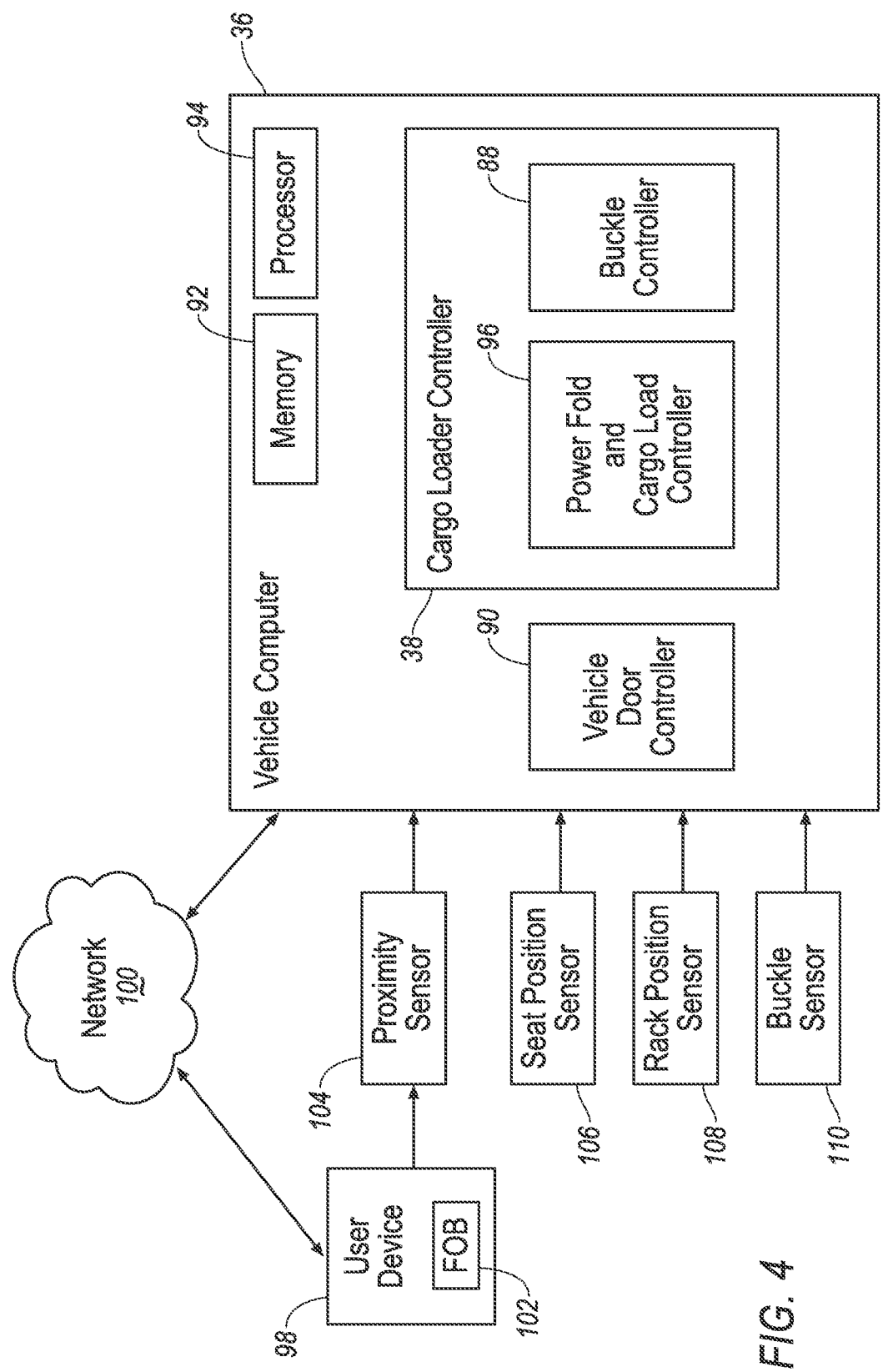
FIG. 4 is a block diagram of a vehicle computer.

With reference to FIG. 4, the vehicle computer 36 may include the cargo loader controller 38, a vehicle door controller 90, a vehicle memory 92 and a vehicle processor 94 programmed to execute instructions stored in the vehicle memory 92.

The cargo loader controller 38 may include a power fold and cargo load controller 96 and the buckle controller 88.

The power fold and cargo load controller 96 may control the vehicle seat 10 and the cargo rack 54 based on instructions from the cargo loader controller 38. Controlling the vehicle seat 10 and the cargo rack 54 may include outputting control signals to move the vehicle seat 10 into the onload/offload position, i.e., actuating the seat motor 50 to move the seat back 14 from one of the first predetermined position and the second predetermined position to the third predetermined position, and actuating the slide motor 56 to move the extendible member 18 from the retracted position to the extended position; and outputting control signals to move the vehicle seat 10 into one of a no-load position and a load position, i.e., actuating the slide motor 56 to move the extendible member 18 from the extended position to the retracted position, and actuating the seat motor 50 to move the seat back 14 from the third predetermined position to one of the first predetermined position and the second predetermined position.

The buckle controller 88 may unlock the buckle 70, based on instructions from the cargo loader controller 38, by outputting a buckle control signal to actuate the buckle 70 to release the latch 76.

The cargo loader controller 38 may control the power fold and cargo load controller 96 and the buckle controller 88 based on instructions from vehicle computer 36. The vehicle 12 may include a plurality of cargo loader controllers 38. Each cargo loader controller 38 may control one cargo loader 40. As an example, the vehicle 12, having four vehicle seats 10 and four cargo loaders 40, may include four cargo loader controllers 38, one for each of the four cargo loaders 40.

The cargo loader controller 38 may output a first cargo loader control signal to the power fold and cargo load controller 96 to move the vehicle seat 10 and the cargo rack 54 in response to instructions from the vehicle computer 36. The cargo loader controller 38 may output a second cargo loader control signal to the buckle controller 88 to unlock the buckle 70 in response to instructions from the vehicle computer 36.

The vehicle door controller 90 may control the vehicle door 26 based on instructions from the vehicle computer 36. Controlling the vehicle door 26 may include opening the vehicle door 26 by outputting a vehicle door control signal to the actuator to release the vehicle door 26, causing the vehicle door 26 to open. The vehicle door controller 90 may open the vehicle door 26 in response to instruction from the vehicle computer 36, as explained below.

The vehicle memory 92 (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc.

The vehicle processor 94, i.e. a processor, is implemented via circuits, chips, or other electronic component and may include one or more microcontrollers, one or more field programmable gate arrays (FPGAs), one or more application specific circuits (ASICs), one or more digital signal processors (DSPs), one or more customer integrated circuits, etc. Each processor is programmed to execute instructions stored in the related memory.

The instructions in the vehicle memory 92 may include receiving user cargo data, sensing a user device 98, controlling the vehicle door 26, the cargo loader 40, and the buckle 70.

The user cargo data may include a request of one of cargo pickup and no cargo pickup. The request of one of cargo pickup and no cargo pickup is a message from the user device 98 to the vehicle computer 36 to request a vehicle 12 to transport one or more passengers and one of with cargo and without cargo, respectively. The vehicle computer 36 may receive the user cargo data from the user device 98 via a network 100, and may store the user cargo data in the vehicle memory 92.

The user device 98 may be any one of a variety of computing devices including a processor and a memory, e.g., a smartphone, a tablet, a personal digital assistant, etc. The user device 98 may communicate with the vehicle computer 36 over various wired and/or wireless technologies, such as an intravehicle network, via Bluetooth® Low Energy (BLE), etc.

The user device 98 may include a fob 102 such as a BLE fob and the vehicle 12 may include a proximity sensor 104 such as a BLE antenna. The BLE antenna may identify the relative location of the BLE fob by employing triangulation, such as 2-D or 3-D triangulation, or received signal strength indication (RSSI).

The proximity sensor 104 may output a signal to the vehicle computer 36, indicating that, e.g., the user device 98 having the fob 102 is approaching the cargo loader 40. The vehicle computer 36 receives the signal from the proximity sensor 104, and determines if the user device 98 having the fob 102 sent a request for cargo pickup. If the user device 98 sent a request for cargo pickup, the vehicle computer 36 instructs the vehicle door controller 90 to open the vehicle door 26. Further, the vehicle computer 36 may instruct the cargo loader controller 38 to send the first cargo loader control signal to the power fold and cargo load controller 96, to move the cargo loader 40 into the onload/offload position based on the request for cargo pickup and whether the vehicle 12 is at a user's route origin or a user's route destination.

The vehicle computer 36 may instruct the cargo loader controller 38 to send the second cargo loader control signal to the buckle controller 88 to unlock the buckle 70, in response to the request for cargo and the vehicle 12 being at the user's route destination.

Referring now to FIGS. 5A-5F, the cargo loader system 22 receives cargo and secures the cargo to the seat back 14 as the power fold and cargo load controller 96 moves the cargo loader 40 through a plurality of positions. The cargo loader system 22 starts in the no-load position, shown in FIG. 5A, where seat back 14 is generally upright. From the no-load position, the cargo loader system 22 moves into the load position, shown in FIG. 5B, where the seat back 14 is partially folded. From the load position, the cargo loader system 22 moves into the load position, shown in FIG. 5F, where the seat back 14 is folded on the seat base 46 with cargo secured on the seat back 14.

Figure 5A:
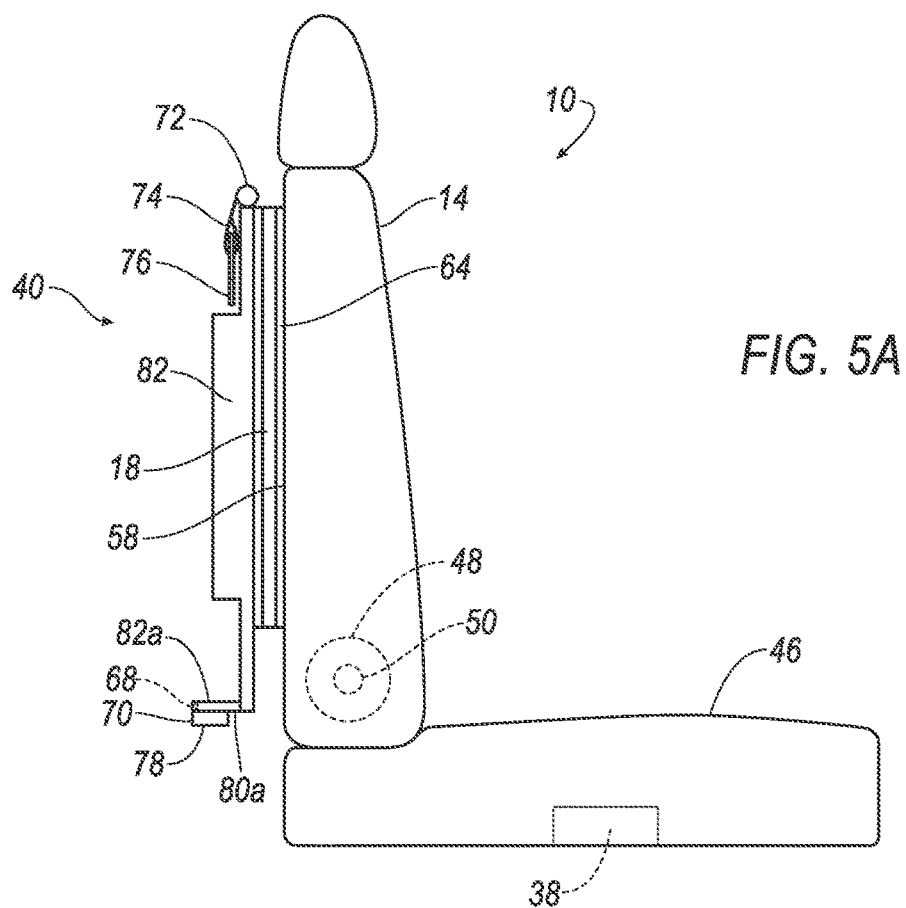
FIGS. 5A-5F illustrate the cargo loader in various stages of onloading cargo.

As shown in FIG. 5A, the cargo loader 40 is in the no-load position and the vehicle seat 10 is in the first predetermined position with no cargo. In the first predetermined position, the seat back 14 may be set generally upright on the seat base 46 and the vehicle seat 10 may receive an occupant on the seat base 46.

Figure 5B:
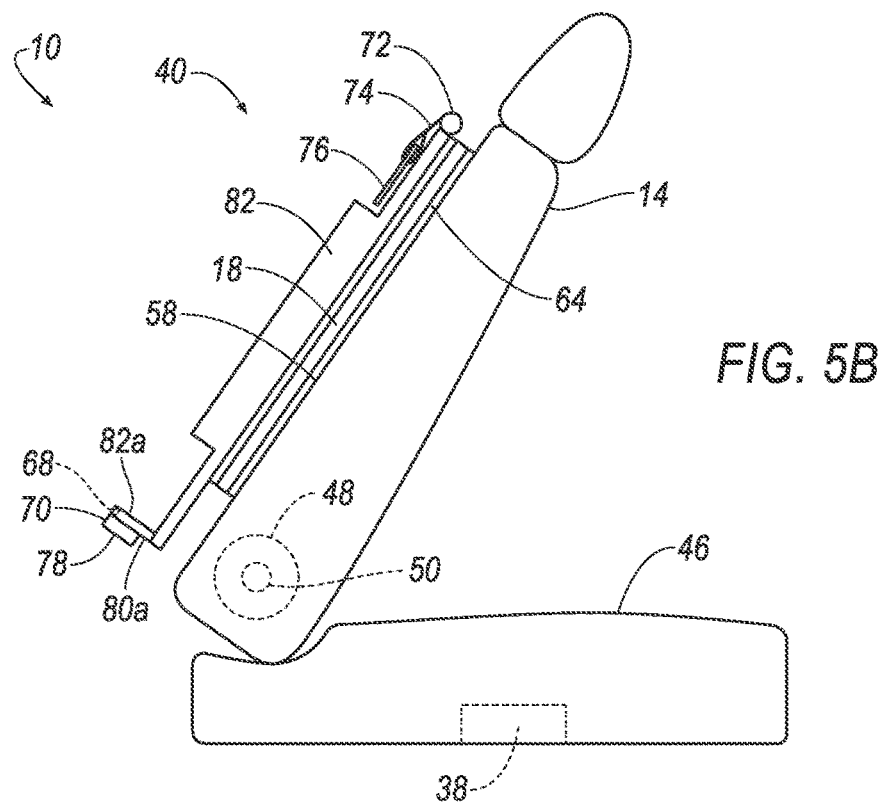

The power fold and cargo load controller 96 receives instructions from the cargo loader controller 38 to onload cargo. Based on the instructions to onload cargo, the power fold and cargo load controller 96 actuates the seat motor 50 to move the seat back 14 from being generally upright to partially folded, as shown in FIG. 5B. A seat position sensor 106 monitors the angle of the seat back 14 as the seat back 14 folds. The seat position sensor 106 outputs a seat position signal to the power fold and cargo load controller 96, indicating the seat back 14 is partially folded and in the third predetermined position. In the third predetermined position, the seat back 14 is tilted toward the seat base 46, i.e., the seat back 14 is at an angle larger than 0 degrees and less than 90 degrees relative to the seat base 46. The extendible member 18 is disposed on the seat back 14. In other words, the extendible member 18 is in the retracted position, resting on the seat back 14. The cargo loader 40 is not available to receive cargo when the extendible member 18 is in the retracted position.

Figure 5C:
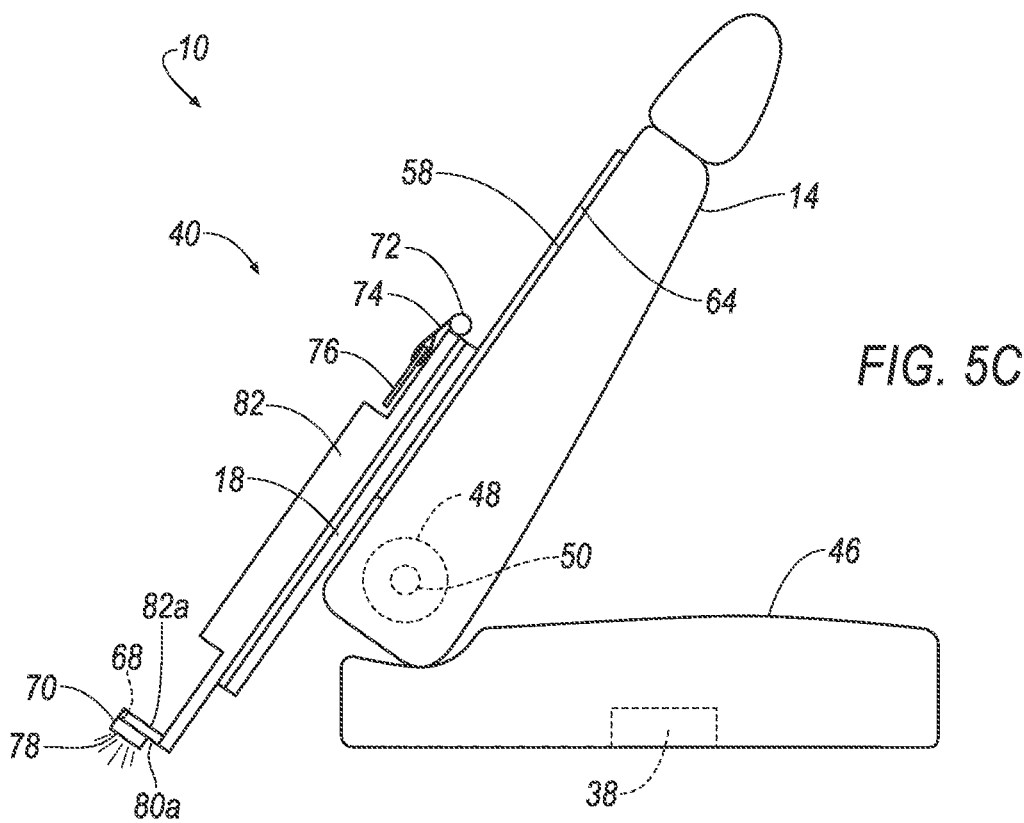

Upon receiving the seat position signal from the seat position sensor 106, indicating the seat back 14 is in the third predetermined position, the power fold and cargo load controller 96 actuates the slide motor 56 to move the extendible member 18 and the cargo rack 54 away from the seat back 14, as shown in FIG. 5C. A rack position sensor 108 monitors how far the extendible member 18 and the cargo rack 54 have moved relative to the seat back 14. The rack position sensor 108 outputs a rack position signal to the power fold and cargo load controller 96, indicating the extendible member 18 and the cargo rack 54 are extended to a predetermined length. When the extendible member 18 and the cargo rack 54 are extended to the predetermined length, the cargo loader 40 is in the onload position and is available to receive cargo. With the extendible member 18 and the cargo rack 54 extending outside the vehicle 12, a user can place cargo on the cargo rack 54, between the ledges 82, and secure the cargo by extending the belt 74 from the retractor 72 over the cargo and securing the latch 76 in the buckle 70. The ledges 82 help secure the cargo and guide the user on proper placement on the cargo rack 54.

Figure 5D:
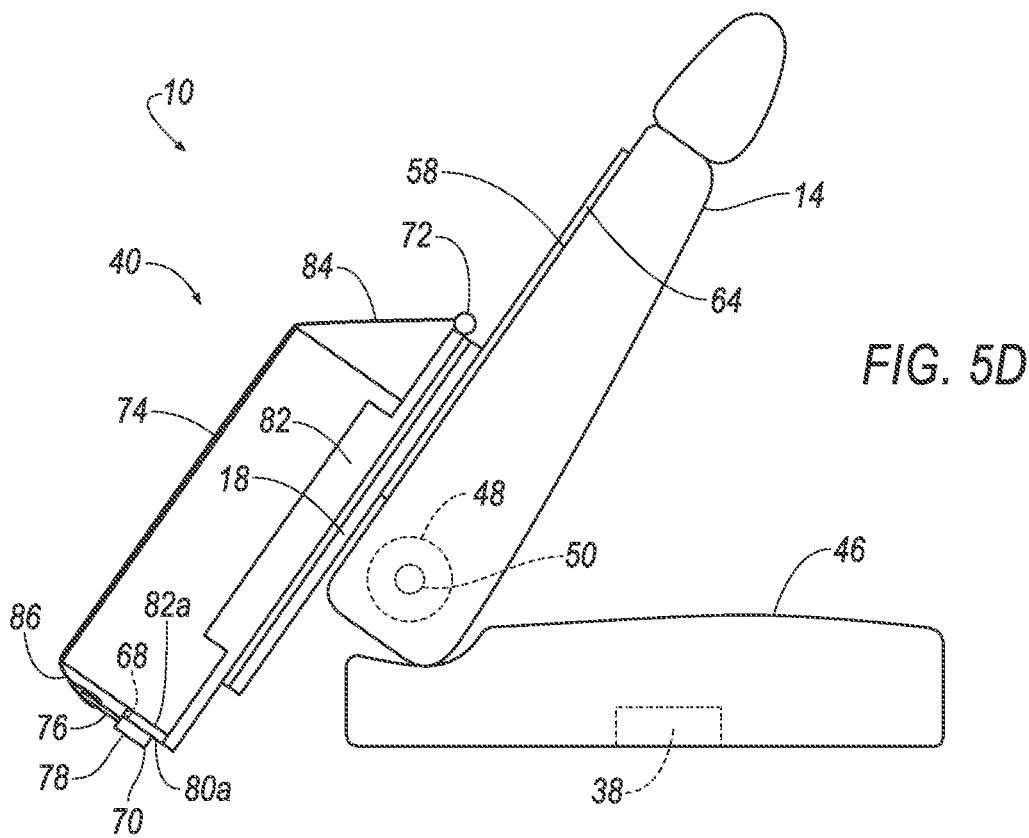

When the power fold and cargo load controller 96 receives the rack position signal, indicating the extendible member 18 and the cargo rack 54 are extended to the predetermined length, the power fold and cargo load controller 96 waits for cargo to be loaded on the cargo rack 54. The power fold and cargo load controller 96 determines the cargo has been loaded based on the measured weight from the weight sensor 68 and a buckle signal from a buckle sensor 110. The power fold and cargo load controller 96 receives the measured weight and determines that the user is in the process of loading cargo based on fluctuations in the measured weight. The power fold and cargo load controller 96 determines the user has completed loading the cargo when the measured weight received from the weight sensor 68 no longer fluctuates, and the measured weight is within the predetermined weight range. Upon determining the cargo has been loaded, the power fold and cargo load controller 96 waits for the buckle signal from the buckle sensor 110, indicating the latch 76 is secured in the buckle 70. FIG. 5D shows the cargo rack 54 loaded with cargo.

Figure 5E:
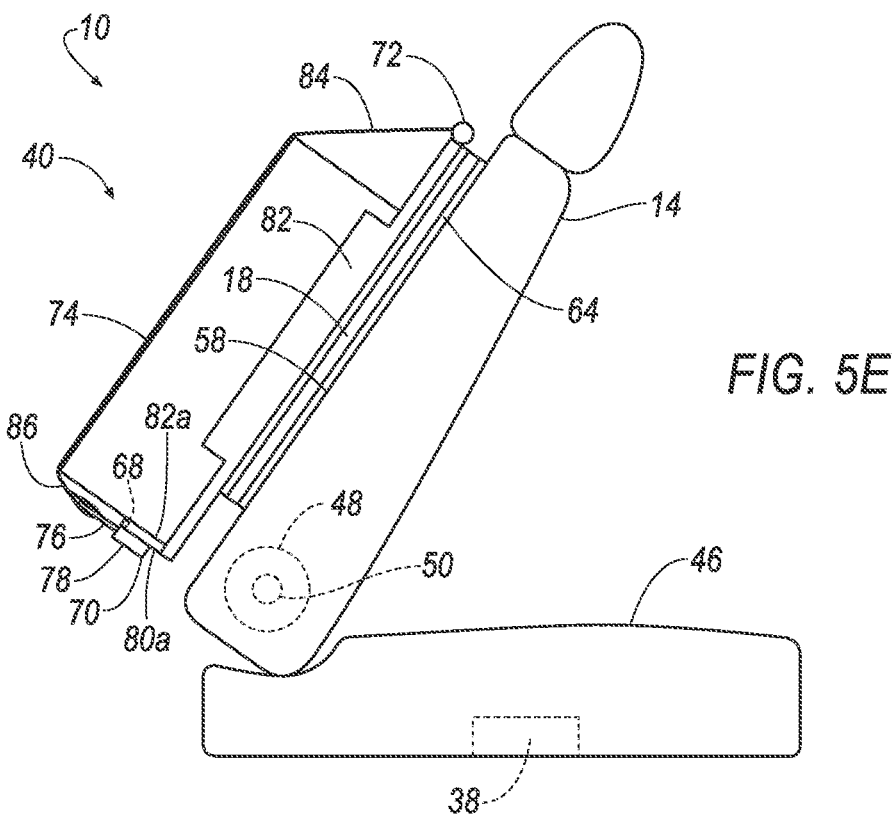

When the power fold and cargo load controller 96 receives the measured weight, with the measured weight within the predetermined weight range, and the buckle signal, indicating the latch 76 is secured in the buckle 70, the power fold and cargo load controller 96 actuates the slide motor 56 to move the extendible member 18 and the cargo rack 54 to the seat back 14, as shown in FIG. 5E. The rack position sensor 108 monitors how far the extendible member 18 and the cargo rack 54 have moved relative to the seat back 14. The rack position sensor 108 outputs the rack position signal to the power fold and cargo load controller 96, indicating the extendible member 18 and the cargo rack 54 have retracted relative to the seat back 14 and are disposed on the seat back 14. The secured cargo is supported by the cargo rack 54 and extendible member 18 on the seat back 14.

Figure 5F:
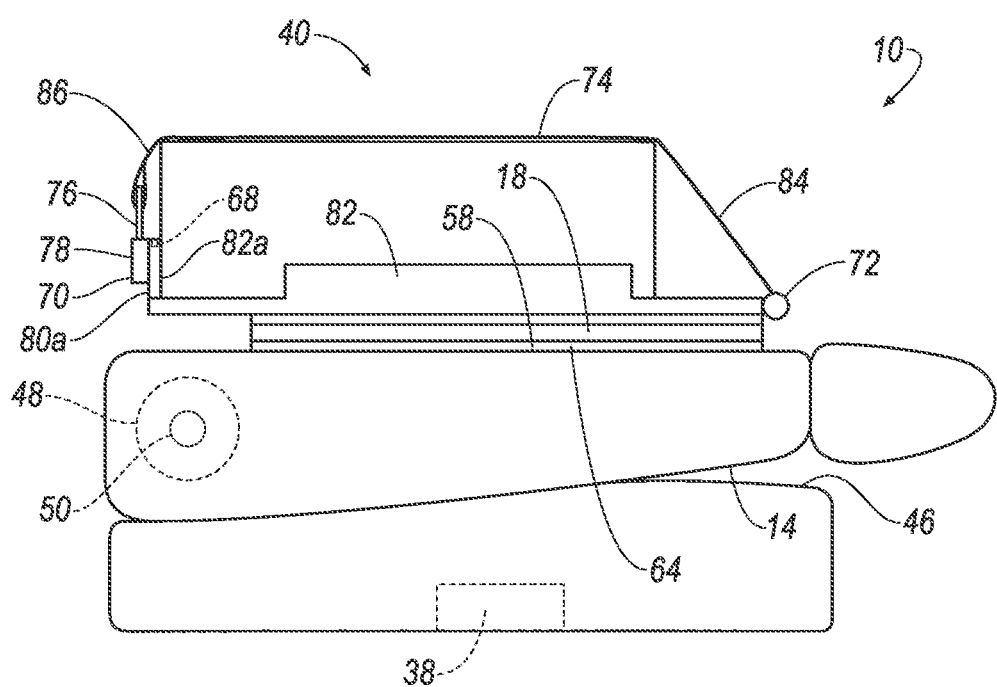

Upon receiving the rack position signal, indicating the extendible member 18 and the cargo rack 54 are disposed on the seat back 14, the power fold and cargo load controller 96 actuates the seat motor 50 to move the seat back 14 from being partially folded to being folded, shown in FIG. 5F. The seat position sensor 106 monitors the angle of the seat back 14 as the seat back 14 folds. The seat position sensor 106 outputs the seat position signal to the power fold and cargo load controller 96, indicating the seat back 14 is folded and in the second predetermined position.

When the power fold and cargo load controller 96 receives the seat position signal indicating the seat back 14 is folded, the power fold and cargo load controller 96 outputs a message to the cargo loader controller 38, indicating the power fold and cargo load controller 96 has completed onloading cargo. In the second predetermined position, the seat back 14 is folded on the seat base 46 with secured cargo on the seat back 14. The extendible member 18 is disposed on the seat back 14. In other words, the extendible member 18 is in the retracted position, resting on the seat back 14 and the seat base 46.

Referring now to FIGS. 6A-6F, the cargo loader system 22 releases cargo secured to the seat back 14 as the power fold and cargo load controller 96 moves the cargo loader 40 through a plurality of positions. The cargo loader system 22 starts in the load position, shown in FIG. 6A, where seat back 14 is folded on the seat base 46 with cargo secured on the seat back 14. From the load position, the cargo loader system 22 moves into the offload position, shown in FIG. 6B, where the seat back 14 is partially folded. From the offload position, the cargo loader system 22 moves into the no-load position, shown in FIG. 6F, where the seat back 14 is generally upright.

Figure 6A:
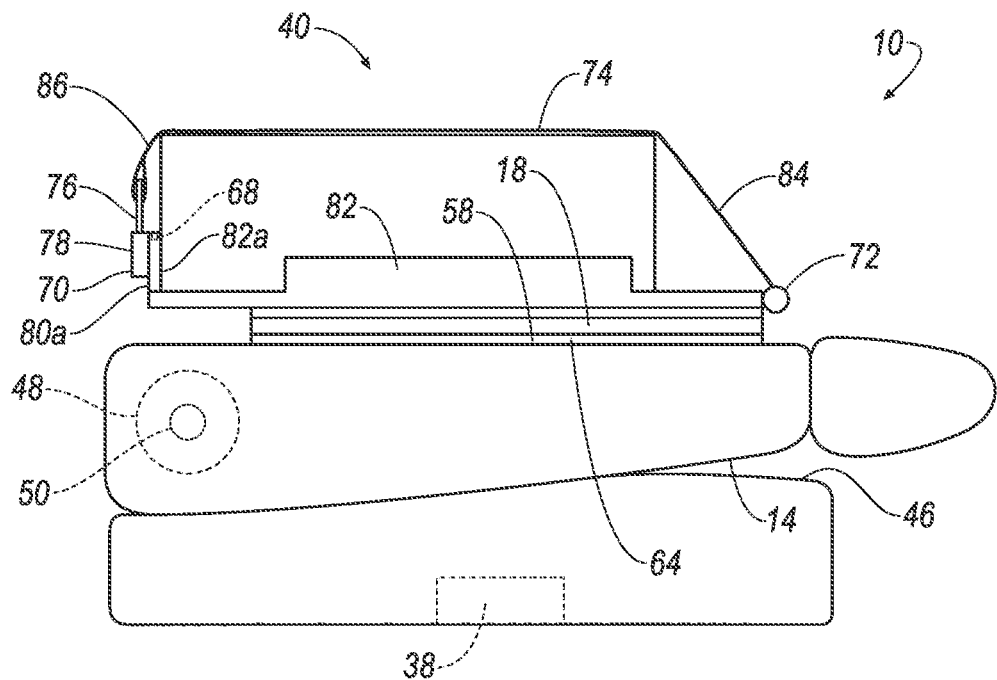
FIGS. 6A-6F illustrate the cargo loader in various stages of offloading cargo.

As shown in FIG. 6A, the cargo loader is in the load position and the vehicle seat 10 is in the second predetermined position. In the second predetermined position, the seat back 14 is folded on the seat base 46 with secured cargo on the seat back 14. The extendible member 18 is disposed on the seat back 14. In other words, the extendible member 18 is in the retracted position, resting on and being supported by the seat back 14 and the seat base 46.

Figure 6B:
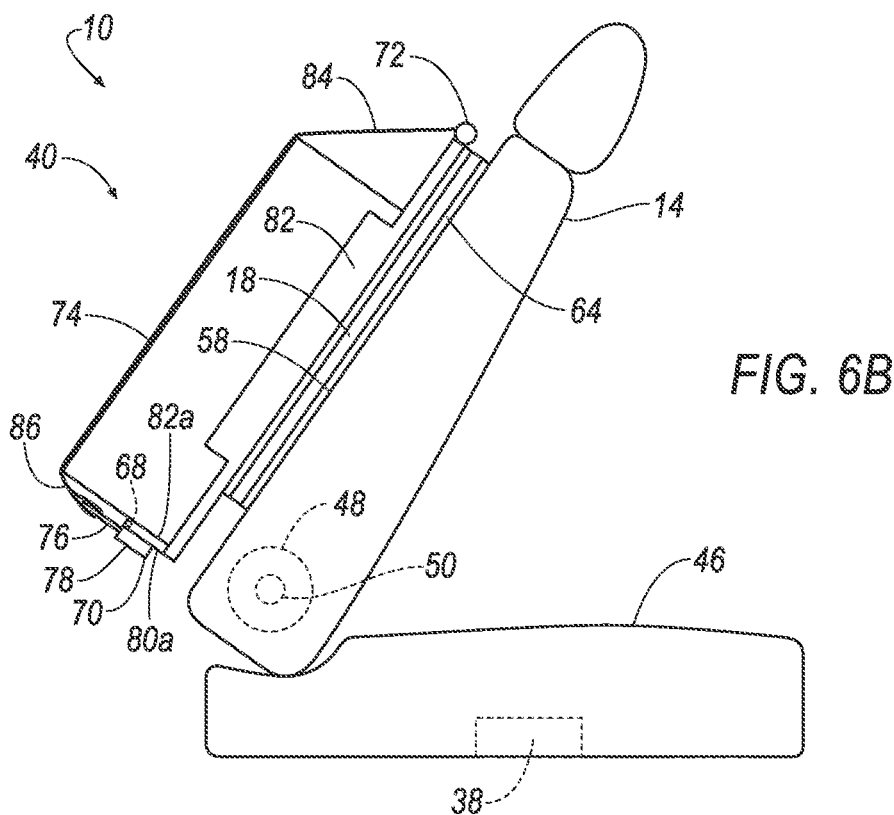

The power fold and cargo load controller 96 receives instructions from the cargo loader controller 38 to offload cargo. Based on the instructions to offload cargo, the power fold and cargo load controller 96 actuates the seat motor 50 to move the seat back 14 from being folded to partially folded, as shown in FIG. 6B. The seat position sensor 106 monitors the angle of the seat back 14 as the seat back 14 unfolds. The seat position sensor 106 outputs the seat position signal to the power fold and cargo load controller 96, indicating the seat back 14 is partially folded and in the third predetermined position. In the third predetermined position, the seat back 14 is tilted toward the seat base 46, i.e., the seat back 14 is at an angle larger than 0 degrees and less than 90 degrees relative to the seat base 46. The extendible member 18 is disposed on the seat back 14. In other words, the extendible member 18 is in the retracted position, resting on the seat back 14. The cargo loader 40 is not available to receive cargo when the extendible member 18 is in the retracted position.

Figure 6C:
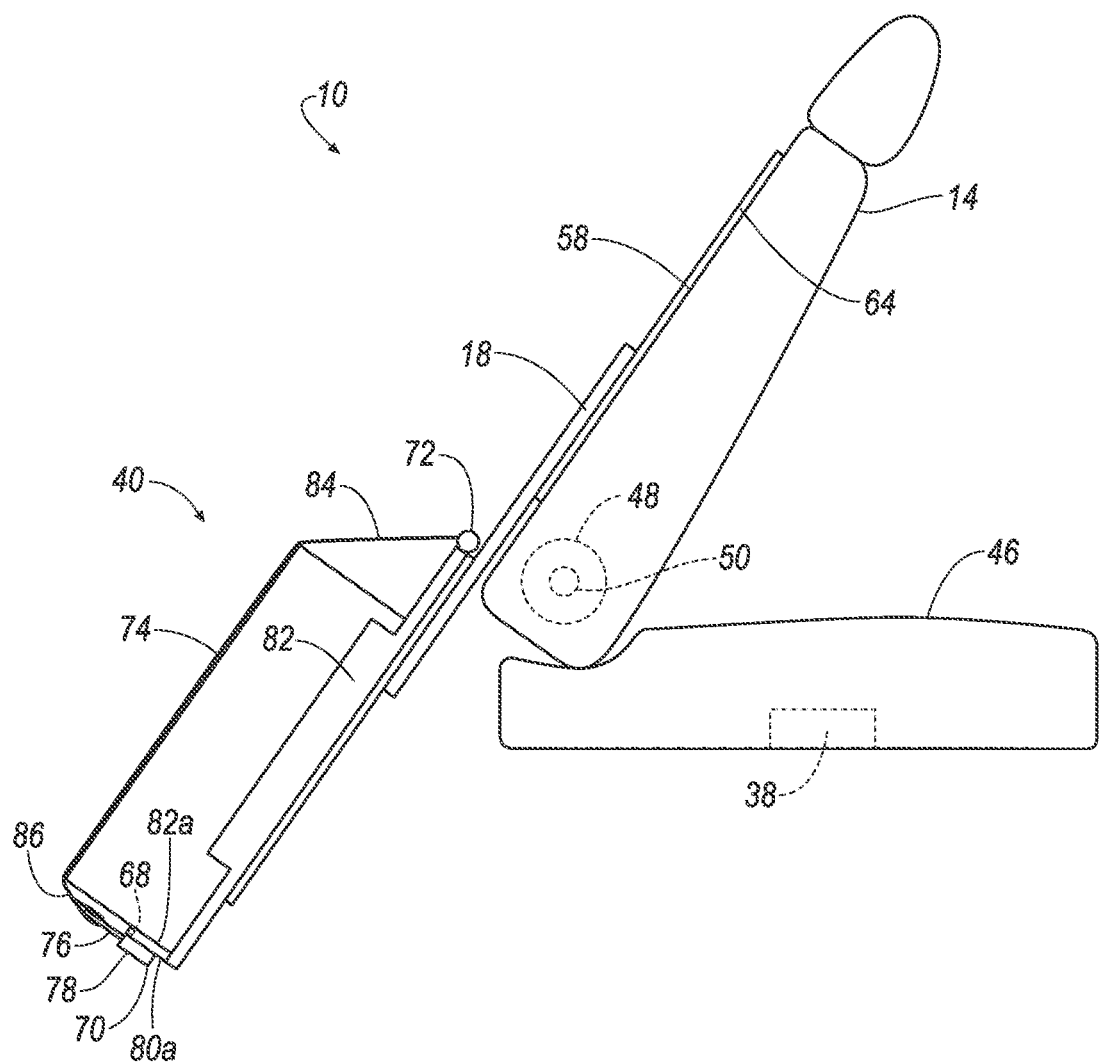

Upon receiving the seat position signal from the seat position sensor 106, indicating the seat back 14 is in the third predetermined position, the power fold and cargo load controller 96 actuates the slide motor 56 to move the extendible member 18 and the cargo rack 54 away from the seat back 14, as shown in FIG. 6C. The rack position sensor 108 monitors how far the extendible member 18 and the cargo rack 54 have moved relative to the seat back 14. The rack position sensor 108 outputs the rack position signal to the power fold and cargo load controller 96, indicating the extendible member 18 and the cargo rack 54 are extended to the predetermined length.

When the power fold and cargo load controller 96 receives the rack position signal, indicating the extendible member 18 and the cargo rack 54 are extended to the predetermined length, the power fold and cargo load controller 96 waits for cargo to be offloaded from the cargo rack 54. With the extendible member 18 and the cargo rack 54 extending outside the vehicle 12, the vehicle computer 36 may receive the signal from the proximity sensor 104, indicating the user device 98 having the fob 102 has approached the cargo loader 40. The vehicle computer 36 may instruct the cargo loader controller 38 to send the second cargo loader control signal to the buckle controller 88, instructing the buckle controller 88 to release the latch 76. Upon receiving the second cargo loader control signal, the buckle controller 88 may output a buckle control signal to actuate the buckle 70 to release the latch 76, and the buckle sensor 110 may output the buckle signal to the power fold and cargo load controller 96, permitting the user to retrieve cargo from the cargo rack 54.

Figure 6D:
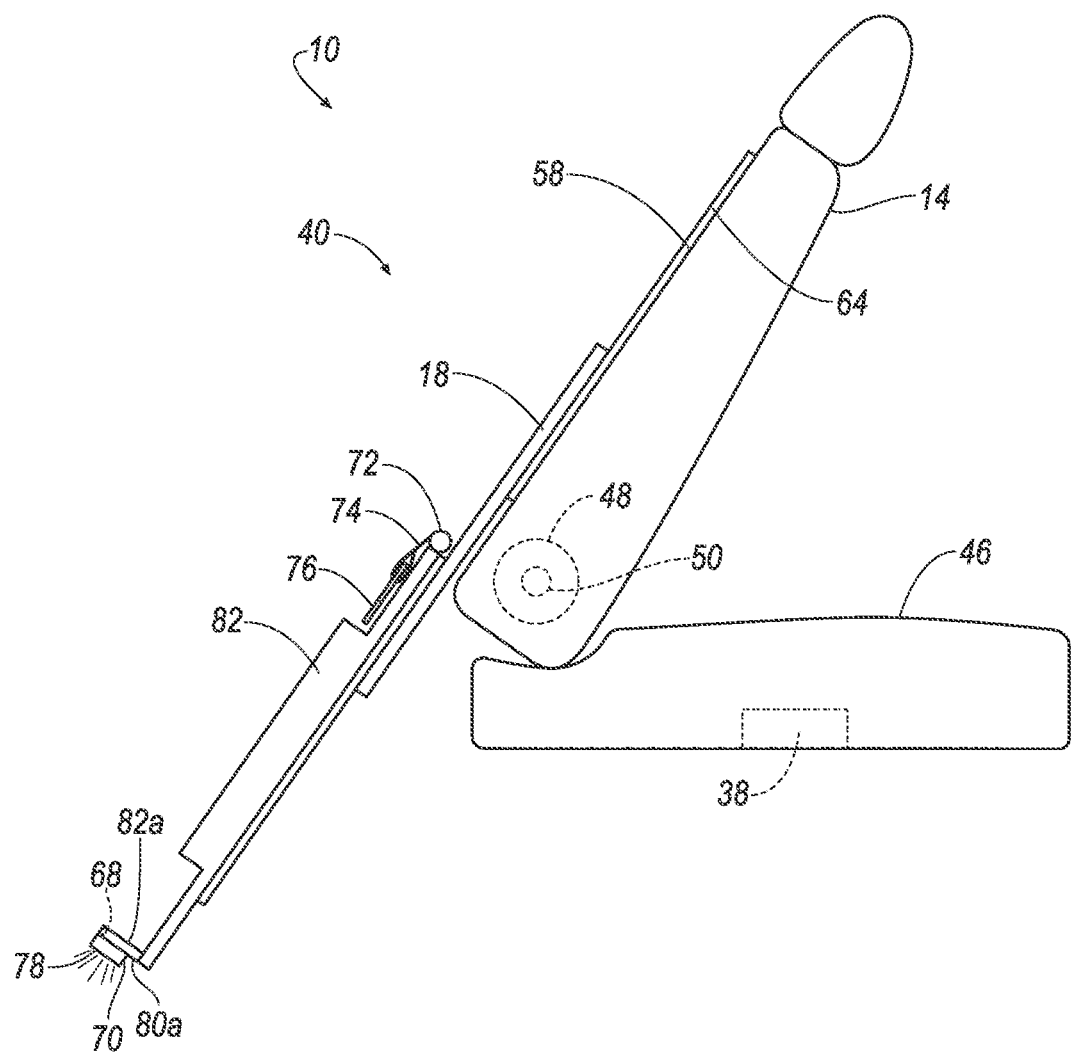

The power fold and cargo load controller 96 determines the cargo is available to be offloaded based on the buckle signal indicating the latch 76 has been released. The power fold and the cargo load controller 96 determines the cargo has been offloaded based on the measured weight from the weight sensor 68. The power fold and cargo load controller 96 receives the measured weight and determines that the user is in the process of offloading cargo based on fluctuations in the measured weight. The power fold and cargo load controller 96 determines the user has completed offloading the cargo when the measured weight received from the weight sensor 68 no longer fluctuates, and the measured weight is zero. FIG. 6D shows the cargo rack 54 with the cargo offloaded.

Figure 6E:
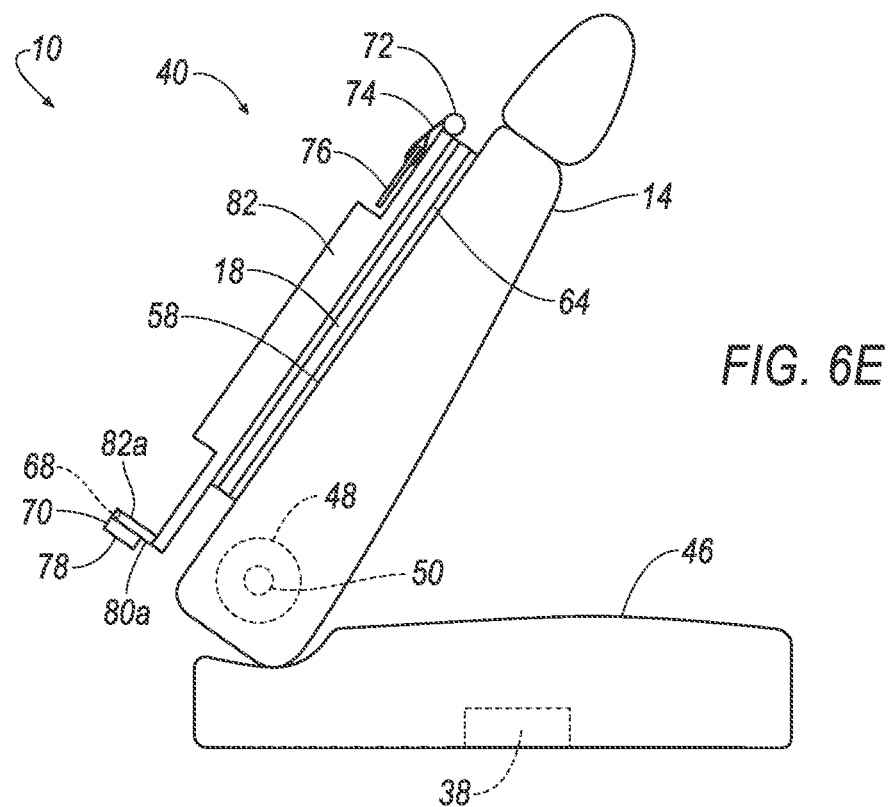

When the power fold and cargo load controller 96 receives the measured weight of zero, the power fold and cargo load controller 96 actuates the slide motor 56 to move the extendible member 18 and the cargo rack 54 to the seat back 14, as shown in FIG. 6E. The rack position sensor 108 monitors how far the extendible member 18 and the cargo rack 54 have moved relative to the seat back 14. The rack position sensor 108 outputs the rack position signal to the power fold and cargo load controller 96, indicating the extendible member 18 and the cargo rack 54 have retracted relative to the seat back 14 and are disposed on the seat back 14.

Figure 6F:
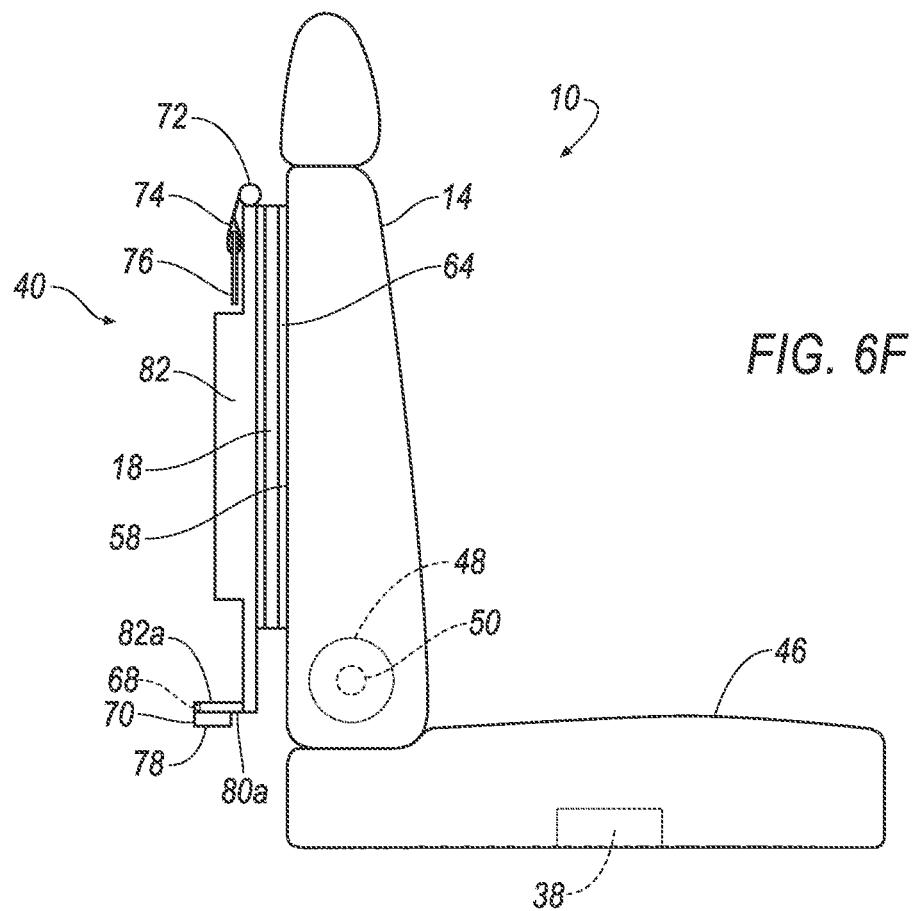

Upon receiving the rack position signal, indicating the extendible member 18 and the cargo rack 54 are disposed on the seat back 14, the power fold and cargo load controller 96 actuates the seat motor 50 to move the seat back 14 from being partially folded to being generally upright, as shown in FIG. 6F. The seat position sensor 106 monitors the angle of the seat back 14 as the seat back 14 unfolds. The seat position sensor 106 outputs the seat position signal to the power fold and cargo load controller 96, indicating the seat back 14 is generally upright and in the first predetermined position.

When the power fold and cargo load controller 96 receives the seat position signal indicating the seat back 14 is generally upright, the power fold and cargo load controller 96 outputs a message to the cargo loader controller 38, indicating the power fold and cargo load controller 96 has completed offloading cargo. In the first predetermined position, the seat back 14 is generally upright and the vehicle seat 10 may receive an occupant on the seat base 46.

Figure 7:
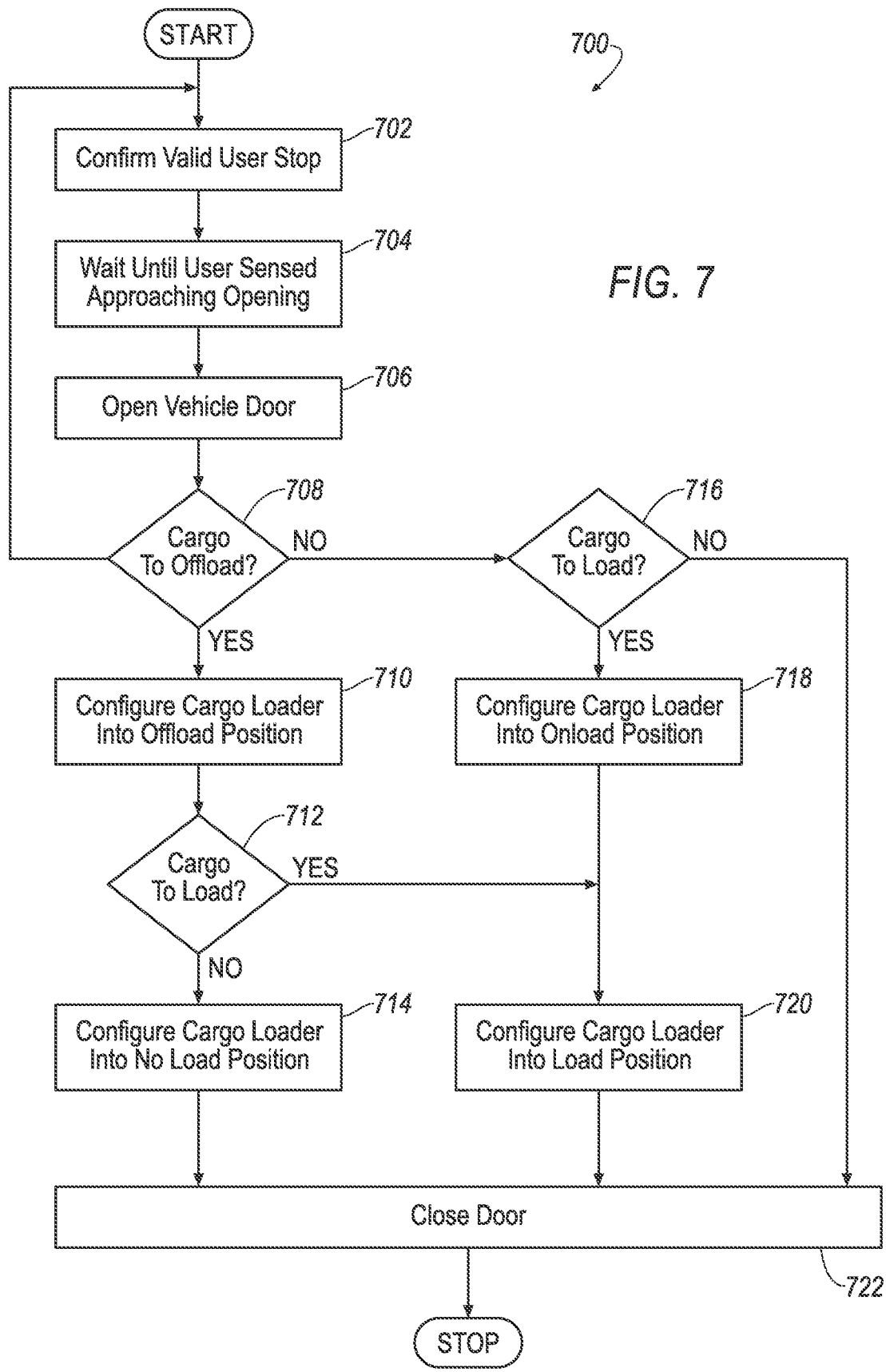
FIG. 7 is a flowchart of an example process that may be executed by the vehicle computer.

FIG. 7 is a flowchart of an example process 700 that may be implemented by the vehicle computer 36 to onload cargo to and offload cargo from the vehicle 12. The process 700 may begin at any time while, e.g., the vehicle 12 is operating. The process 700 may continue to execute until, e.g., the vehicle 12 is no longer in use.

At block 702, the vehicle computer 36 confirms a valid user stop. The vehicle processor 94 may confirm the valid user stop by receiving a signal from, e.g., a vehicle sensor or a global positioning system (GPS) to determine the vehicle is stationary, and by receiving user cargo data that includes a request of cargo pickup, i.e., indicating cargo is scheduled to be picked up or dropped off, at the vehicle's location.

At block 704, the vehicle computer 36 waits for the user to approach the related cargo loader 40. As previously mentioned and as an example, the vehicle processor 94 may receive a signal from a proximity sensor 104 such as a BLE antenna to indicate the user, having a fob 102 such as a BLE fob, is approaching the cargo loader 40. The BLE antenna may identify the relative location of the BLE fob 102 by employing triangulation, such as 2-D or 3-D triangulation, or received signal strength indication (RSSI).

At block 706, the vehicle computer 36 opens the vehicle door 26 associated with the cargo loader 40, i.e., the vehicle door 26 nearest to the cargo loader 40. The vehicle door controller 90 may open the vehicle door 26 by outputting a signal to the actuator to release the vehicle door 26, causing the vehicle door 26 to open. As one example, the vehicle door controller 90 may open the rear vehicle door 30 for the user to access the cargo loader 40 disposed on the vehicle seats 10 in the rear row 42 of the vehicle 12. As another example, the vehicle door controller 90 may open the side vehicle door 34 for the user to access the cargo loader 40 disposed on the vehicle seats 10 in the middle row 44 of the vehicle 12.

At decision block 708, the vehicle computer 36 determines whether the user, as an example, a departing user, i.e. a user leaving the vehicle 12, has cargo to offload. The vehicle processor 94 determines whether the user has cargo to offload by identifying whether the related user cargo data includes a request of one of cargo pickup and no cargo pickup. If the vehicle processor 94 determines that the user does not have cargo to offload, i.e., the related user cargo data includes a request of no cargo pickup, the process 700 proceeds to decision block 716. If the vehicle processor 94 determines that the user has cargo to offload, i.e., the related user cargo data includes a request of cargo pickup, the process 700 proceeds to block 710.

Figure 8:
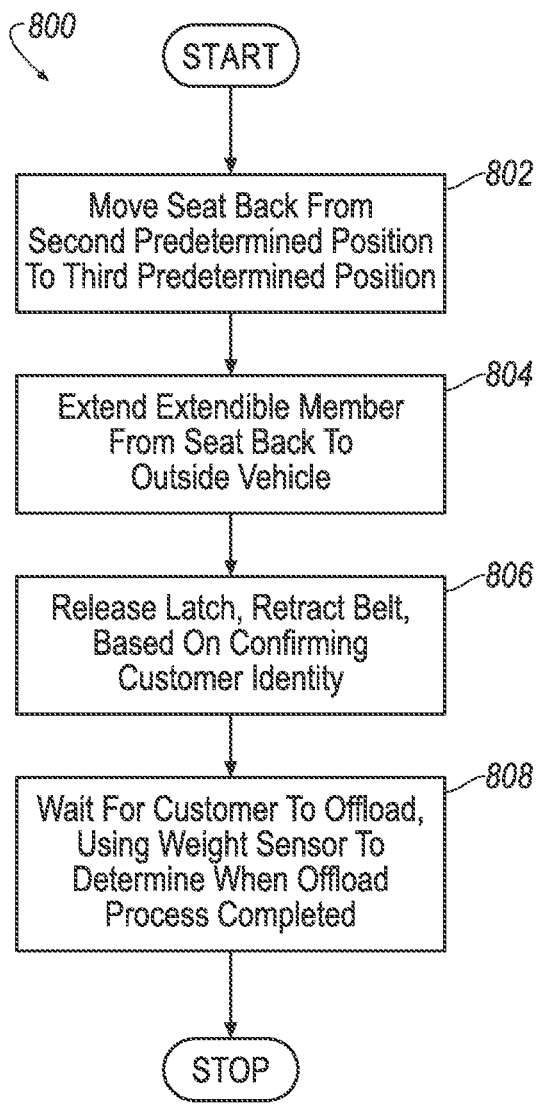
FIG. 8 is a flowchart of an example process for configuring the cargo loader into an offload position.

At block 710, the vehicle computer 36 moves the cargo loader 40 into the offload position, i.e., the third predetermined position. FIG. 8 is a flowchart of an example process 800 that may be implemented by the cargo loader controller 38 to move the cargo loader 40 into the offload position. For example, as explained in greater detail below with respect to FIG. 8, the cargo loader controller 38 moves the cargo loader 40 into the offload position by partially unfolding the seat back 14 and extending the extendible member 18. After moving the cargo loader 40 into the offload position, the process 700 proceeds to decision block 712.

At decision block 712, the vehicle computer 36 determines whether a second user, as an example, an arriving user, i.e., a user boarding the vehicle, has cargo to onload. The vehicle processor 94 determines whether the arriving user has cargo to onload by identifying whether the related user cargo data includes a request of one of cargo pickup and no cargo pickup. If the related user cargo data includes a request of no cargo pickup, the vehicle processor 94 determines the arriving user has no cargo is to be onloaded, and the process 700 proceeds to block 714. If the related user cargo data includes a request of cargo pickup, the vehicle processor 94 determines the arriving user has cargo to onload, and the process 700 proceeds to block 720.

Figure 9:
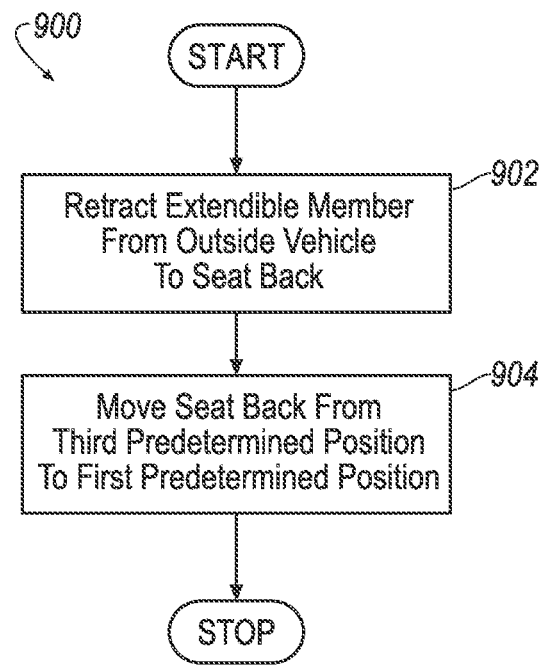
FIG. 9 is a flowchart of an example process for configuring the cargo loader into a no-load position.

At block 714, the vehicle computer 36 moves the cargo loader 40 into the no-load position. FIG. 9 is a flowchart of an example process 900 that may be implemented by the cargo loader controller 38 to move the cargo loader 40 into the no-load position. For example, as explained in greater detail below with respect to FIG. 9, the cargo loader controller 38 moves the cargo loader 40 into the no-load position by retracting the extendible member 18 and unfolding the seat back 14. After moving the cargo loader 40 into the no-load position, the process 700 proceeds to block 722.

At decision block 716, the vehicle computer 36 determines whether the user, as an example, an arriving user, has cargo to onload. The vehicle processor 94 determines whether the arriving user has cargo to onload by identifying whether the related user cargo data includes a request of one of cargo pickup and no cargo pickup. If the related user cargo data includes a request of no cargo pickup, the vehicle processor 94 determines no cargo is to be onloaded, and the process 700 proceeds to block 722. If the related user cargo data includes a request of cargo pickup, the vehicle processor 94 determines the arriving user has cargo to onload, and the process 700 proceeds to block 718.

Figure 10:
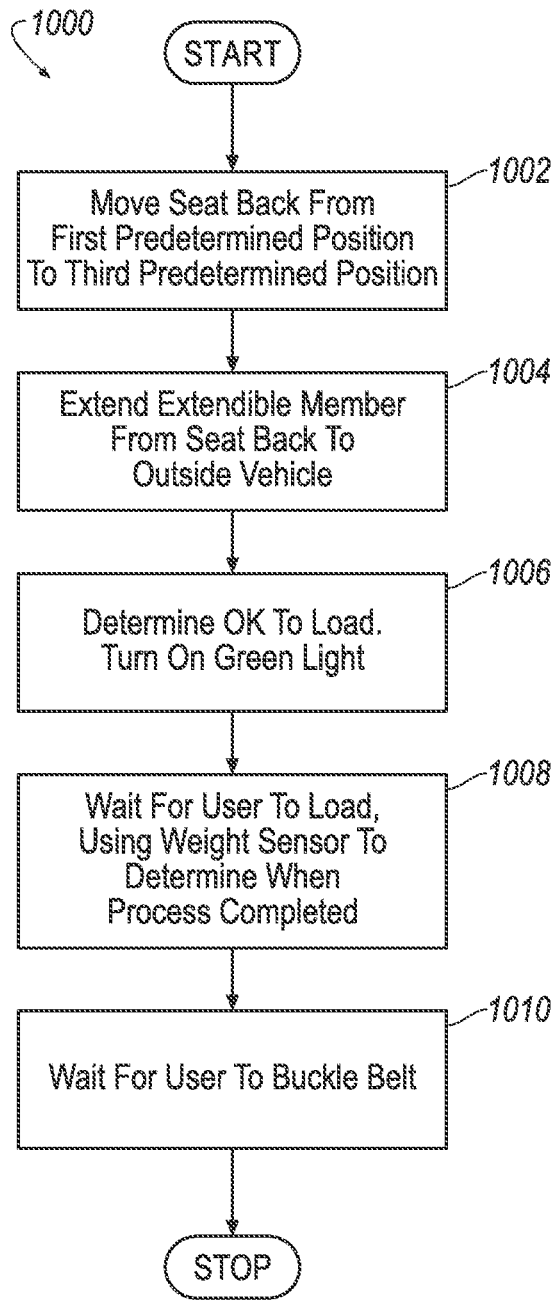
FIG. 10 is a flowchart of an example process for configuring the cargo loader into an onload position.

At block 718, the vehicle computer 36 moves the cargo loader 40 into the onload position. FIG. 10 is a flowchart of an example process 1000 that may be implemented by the cargo loader controller 38 to move the cargo loader 40 into the onload position. For example, as explained in greater detail below with respect to FIG. 10, the cargo loader controller 38 moves the cargo loader 40 into the onload position by partially unfolding the seat back 14 and extending the extendible member 18. After moving the cargo loader 40 into the onload position, the process 700 proceeds to block 720.

Figure 11:
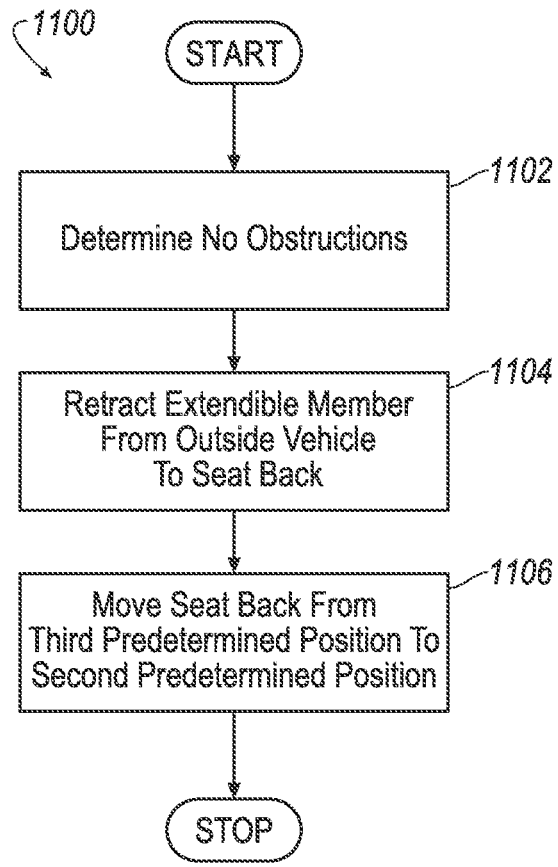
FIG. 11 is a flowchart of an example process for configuring the cargo loader into a load position.

At block 720, the cargo loader 40 receives cargo and the vehicle computer 36 moves the cargo loader 40 into the load position. FIG. 11 is a flowchart of an example process 1100 that may be implemented by the cargo loader controller 38 to move the cargo loader 40 into the load position. For example, as explained in greater detail below with respect to FIG. 11, the cargo loader controller 38 moves the cargo loader 40 into the load position by retracting the extendible member 18 and folding the seat back 14. After moving the cargo loader 40 into the load position, the process 700 proceeds to block 722.

At block 722, the vehicle computer 36 closes the vehicle door 26 associated with the cargo loader 40, e.g., the vehicle door 26 nearest to the cargo loader 40. The vehicle door controller 90 may close the vehicle door 26 by outputting a signal to the actuator to close the vehicle door 26. The process 700 ends after block 722.

FIG. 8 is a flowchart of an example process 800 that may be implemented by the cargo loader controller 38 to move the cargo loader 40, having cargo, into the offload position. The process 800 may begin when the vehicle 12 is stationary and the seat back 14 is in the second predetermined position, i.e., the seat back 14 is folded with the extendible member 18 disposed on the seat back 14 and cargo on the cargo rack 54. The process 800 may continue to execute until the weight sensor 68, measuring the weight on the cargo rack 54, returns a measured weight of zero to the vehicle computer 36, indicating the cargo has been offloaded.

At block 802, the cargo loader controller 38, specifically the power fold and cargo load controller 96 actuates the seat motor 50 to move the seat back 14 from the second predetermined position, as shown in FIG. 5A, to the third predetermined position, as shown in FIG. 5B. The seat motor 50 may move the seat back 14 from the second predetermined position, where the seat back 14 is folded, about the hinge 48 to the third predetermined position, where the seat back 14 is partially unfolded and the seat back 14 is tilted toward the seat base 46, i.e., the seat back 14 is at an angle larger than 0 degrees and less than 90 degrees relative to the seat base 46.

At block 804, the cargo loader controller 38, specifically the power fold and cargo load controller 96 actuates the slide motor 56 to extend the extendible member 18 from the seat back 14, as shown in FIG. 5B, to outside the vehicle 12, as shown in FIG. 5C. The slide motor 56 moves the extendible member 18, supporting cargo on the cargo rack 54, away and downward from the seat back 14 to outside the vehicle 12, along the track 16.

At block 806, the vehicle computer 36 may verify the user's identity by receiving a signal from the proximity sensor 104 such as a BLE antenna, where the BLE antenna may receive a signal from the user having an identifiable BLE fob 102. Upon verifying the identity of the user, the cargo loader controller 38 may output a signal to unlock the buckle 70 and release the latch 76. Specifically, the buckle controller 88 outputs a buckle control signal to actuate the buckle 70 to release the latch 76. The retractor 72 retracts the belt 74.

At block 808, the cargo loader controller 38 waits for the user to offload the cargo. The weight sensor 68 continuously measures the weight on the cargo rack 54. The weight sensor 68 outputs the measured weight to the vehicle computer 36. The vehicle computer 36 may determine from the fluctuations in the measured weight that the user is in the process of taking off the cargo, and may further determine that the user has taken off the cargo when the measured weight is zero. The vehicle computer 36 may output a signal to the cargo loader controller 38 that process 800 has been completed as a result of determining that the user has taken the cargo off the cargo rack 54. The process 800 ends after block 808.

FIG. 9 is a flowchart of an example process 900 that may be implemented by the cargo loader controller 38 to move the cargo loader 40, not having cargo, into the no-load position. The process 900 may begin when the vehicle 12 is stationary and the seat back 14 is in the third predetermined position, i.e., the seat back 14 is partially unfolded with the extendible member 18 extended outside the vehicle 12 and no cargo on the cargo rack 54. The process 900 may continue to execute until the seat back 14 is in the first predetermined position, i.e., the seat back 14 is generally upright.

At block 902, the cargo loader controller 38, specifically, the power fold and cargo load controller 96 actuates the slide motor 56 to retract the extendible member 18 from outside the vehicle 12, as shown in FIG. 6D, to the seat back 14, as shown in FIG. 6E. The slide motor 56 moves the extendible member 18 away and upward from the outside of the vehicle 12 to the seat back 14, along the track 16, until the extendible member 18 is disposed on the seat back 14.

At block 904, the cargo loader controller 38, specifically the power fold and cargo load controller 96 actuates the seat motor 50 to move the seat back 14 from the third predetermined position, where the seat back 14 is partially unfolded and the seat back 14 is tilted toward the seat base 46, i.e., the seat back 14 is at an angle larger than 0 degrees and less than 90 degrees relative to the seat base 46, as shown in FIG. 6E, about the hinge 48 to the first predetermined position, where the seat back 14 is generally upright, as shown in FIG. 6F. The process 900 ends after block 904.

FIG. 10 is a flowchart of an example process 1000 that may be implemented by the cargo loader controller 38 to move the cargo loader 40, not having cargo, into the onload position. The process 1000 may begin when the vehicle 12 is stationary and the seat back 14 is in the first predetermined position, i.e., the seat back 14 is generally upright, with the extendible member 18 retracted and disposed on the seat back 14 and no cargo on the cargo rack 54. The process 1000 may continue to execute until the seat back 14 is in the third predetermined position, where the seat back 14 is partially unfolded and the seat back 14 is tilted toward the seat base 46, i.e., the seat back 14 is at an angle larger than 0 degrees and less than 90 degrees relative to the seat base 46, and the extendible member 18 extends outside the vehicle 12 with cargo on the cargo rack 54, secured with the buckle 70.

At block 1002, the cargo loader controller 38, specifically the power fold and cargo load controller 96 actuates the seat motor 50 to move the seat back 14 from the first predetermined position, as shown in FIG. 5A, to the third predetermined position, as shown in FIG. 5B. The seat motor 50 may move the seat back 14 from the first predetermined position, where the seat back 14 is generally upright, about the hinge 48 to the third predetermined position, where the seat back 14 is partially folded and the seat back 14 is tilted toward the seat base 46, i.e., the seat back 14 is at an angle larger than 0 degrees and less than 90 degrees relative to the seat base 46.

At block 1004, the cargo loader controller 38, specifically the power fold and cargo load controller 96 actuates the slide motor 56 to extend the extendible member 18 from the seat back 14, as shown in FIG. 5B, to outside the vehicle 12, as shown in FIG. 5C. The slide motor 56 moves the extendible member 18, without cargo on the cargo rack 54, away and downward from the seat back 14 to outside the vehicle 12, along the track 16.

At block 1006, the cargo loader controller 38 determines the cargo loader 40 is safe to load when the extendible member 18 is extended outside the vehicle 12. The cargo loader controller 38 may output a signal to illuminate the indicator light 78, indicating to the user the cargo loader 40 is safe to load.

At block 1008, the cargo loader controller 38 waits for the user to load the cargo. The weight sensor 68 continuously measures the weight on the cargo rack 54 and outputs the measured weight to the vehicle computer 36. The vehicle computer 36 receives the measured weight and determines that the user is in the process of loading cargo based on fluctuations in the measured weight. The vehicle computer 36 determines the user has completed loading the cargo when the measured weight received from the weight sensor 68 no longer fluctuates.

At block 1010, the cargo loader controller 38 waits for a signal from the buckle 70, indicating the latch 76 is engaged with the buckle 70. The process 1000 ends after block 1010.

FIG. 11 is a flowchart of an example process 1100 that may be implemented by the cargo loader controller 38 to move the cargo loader 40, having cargo, into the load position. The process 1100 may begin when the vehicle 12 is stationary and the seat back 14 is in the third predetermined position, i.e., the seat back 14 is partially folded and the extendible member 18 extends outside the vehicle 12 with cargo on the cargo rack 54, secured with the buckle 70. The process 1100 may continue to execute until the seat back 14 is in the second predetermined position, i.e., the seat back 14 is folded with the extendible member 18 disposed on the seat back 14 and cargo on the cargo rack 54.

At block 1102, the cargo loader controller 38 determines the measured weight of the cargo is within the predetermined weight range by receiving an output signal from the weight sensor 68, indicating the measured weight is more than a predetermined minimum weight limit such as 5 lbs., and less than a predetermined maximum weight limit such as 75 lbs. The cargo loader controller 38 may prevent the cargo loader 40 from retracting if the measured weight of the cargo is not within the predetermined weight range. The cargo loader controller 38 may output a signal to illuminate the indicator light 78, indicating to the user the measured weight of the cargo is not within the predetermined weight range.

At block 1104, the cargo loader controller 38, specifically the power fold and cargo load controller 96 actuates the slide motor 56 to retract the extendible member 18 from outside the vehicle 12, as shown in FIG. 5D, to the seat back 14, as shown in FIG. 5E. The slide motor 56 moves the extendible member 18, with cargo on the cargo rack 54, upward and to the seat back 14 from outside the vehicle 12, along the track 16. As the slide motor 56 moves the extendible member 18 to the seat back 14, the cargo loader controller 38 monitors the cargo loader 40 to ensure the cargo loader 40 does not encounter resistance. As an example, if the cargo is improperly placed on the cargo rack 54 and the cargo loader 40 encounters resistance as the slide motor 56 retracts the extendible member 18, the cargo loader controller 38 may stop the slide motor 56 from retracting the extendible member 18 to the seat back 14 and may actuate the slide motor 56 to extend the extendible member 18. The cargo loader controller 38 may output a signal to illuminate the indicator light 78, indicating to the user the cargo is improperly placed. As another example, the cargo loader controller 38 may output a signal as a text message to a mobile device. The cargo loader controller 38 may wait to receive a signal from the buckle controller 88, indicating the latch 76 has been released from the buckle 70 and then, re-engaged with the buckle 70. The power fold and cargo load controller 96 may actuate the slide motor 56 to retract the extendible member 18 from outside the vehicle 12 to the seat back 14. If the cargo does not encounter resistance, the process 1100 may proceed to block 1106.

At block 1106, the cargo loader controller 38, specifically the power fold and cargo load controller 96 actuates the seat motor 50 to move the seat back 14 from the third predetermined position, where the seat back 14 is partially folded and the seat back 14 is tilted toward the seat base 46, i.e., the seat back 14 is at an angle larger than 0 degrees and less than 90 degrees relative to the seat base 46, as shown in FIG. 5E, about the hinge 48 to the second predetermined position, as shown in FIG. 5F, where the seat back 14 is folded on the seat base 46 with cargo secured on the seat back 14. The process 1100 ends after block 1106.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A vehicle seat comprising:
a seat back;
a track attached to the seat back; and
an extendible member moveably engaged with the track, wherein the extendible member is moveable along the seat back between a retracted position and an extended position, wherein the extendible member extends outside a vehicle when the extendible member is in the extended position.

2. The vehicle seat of claim 1, further comprising a cargo rack disposed on the extendible member, wherein the cargo rack moves with the extendible member relative to the seat back.

3. The vehicle seat of claim 2, wherein the cargo rack has a platform having a plurality of sides and a plurality of ledges, wherein each of the plurality of ledges extends from a respective one of the plurality of sides, wherein the plurality of sides includes a bottom side, wherein the plurality of ledges includes a bottom ledge extending from the bottom side.

4. The vehicle seat of claim 3, further comprising a weight sensor disposed on the bottom ledge.

5. The vehicle seat of claim 3, further comprising:
a buckle disposed on a first one of the plurality of ledges;
a retractor disposed on a second one of the plurality of ledges, wherein the second one of the plurality of ledges is disposed on one of the plurality of sides of the cargo rack opposite the first one of the plurality of ledges; and
a belt having a latch and extending from the retractor, the latch being releasably engageable with the buckle.

6. The vehicle seat of claim 5, further comprising a computer including a memory and a processor programmed to execute instructions stored in the memory, the instructions including outputting a control signal to the buckle to release the latch from the buckle.

7. The vehicle seat of claim 1, wherein the extendible member includes a plurality of sliding members, wherein the plurality of sliding members includes a first sliding member and a second sliding member, wherein the first sliding member is moveable along the track and wherein the second sliding member is moveable relative to the first sliding member.

8. A vehicle computer comprising:
a memory; and
a processor programmed to execute instructions stored in the memory, the instructions including:
receiving user cargo data;
controlling a vehicle door based on the user cargo data; and
controlling a vehicle seat having a seat back and a cargo rack based on the user cargo data, wherein the cargo rack is disposed on an extendible member supported by the seat back, wherein controlling the vehicle seat includes outputting a control signal commanding the extendible member to move between a retracted position and an extended position, wherein the extendible member extends outside a vehicle when the extendible member is in the extended position moveably engaged to the vehicle seat.

9. The vehicle computer of claim 8, wherein the user cargo data includes a request of one of cargo pickup and no cargo pickup.

10. The vehicle computer of claim 8, wherein controlling the vehicle door includes opening the vehicle door as a result of receiving the user cargo data, wherein the user cargo data is received as a user input provided to one of a vehicle sensor and a fob.

11. The vehicle computer of claim 8, wherein controlling the vehicle seat and the cargo rack includes moving the seat back of the vehicle seat from one of a first predetermined position and a second predetermined position to a third predetermined position and moving the extendible member along a track disposed on the seat back from a retracted position to an extended position.

12. The vehicle computer of claim 11, wherein controlling the vehicle seat and the cargo rack includes moving the extendible member along the track disposed on the seat back from the extended position to the retracted position and moving the seat back from the third predetermined position to one of the first predetermined position and the second predetermined position after moving the extendible member to the retracted position.

13. A vehicle comprising:
a body defining an opening;
a seat having a seat base supported by the body and having a seat back supported by the seat base;
a track disposed on the seat back; and
an extendible member moveably engaged with the track, wherein the extendible member is moveable along the seat back between a retracted position and an extended position, wherein in the extended position, the extendible member extends outside the opening of the body.

14. The vehicle of claim 13, further comprising a cargo rack disposed on the extendible member, wherein the cargo rack moves with the extendible member relative to the seat back.

15. The vehicle of claim 14, wherein the cargo rack has a platform having a plurality of sides and a plurality of ledges, wherein each of the plurality of ledges extends from a respective one of the plurality of sides, wherein the plurality of sides includes a bottom side, wherein the plurality of ledges includes a bottom ledge extending from the bottom side.

16. The vehicle of claim 15, further comprising a weight sensor fixed to the bottom ledge.

17. The vehicle of claim 15, further comprising:
a buckle disposed on a first one of the plurality of ledges;
a retractor disposed on a second one of the plurality of ledges, wherein the second one of the plurality of ledges is disposed on one of the plurality of sides of the cargo rack opposite the first one of the plurality of ledges; and
a belt extending from the retractor and releasably engageable with the buckle.

18. The vehicle of claim 17, further comprising a computer including a memory and a processor programmed to execute instructions stored in the memory, the instructions including outputting a control signal to the buckle to release the latch from the buckle.

19. The vehicle of claim 13, wherein the extendible member includes a plurality of sliding members, wherein the plurality of sliding members includes a first sliding member and a second sliding member, the first sliding member is moveable along the track and wherein the second sliding member is moveable relative to the first sliding member.

* * * * *